(12) United States Patent
Gao et al.

(10) Patent No.: US 11,224,064 B2
(45) Date of Patent: Jan. 11, 2022

(54) SYSTEMS AND METHODS FOR SIGNALING STARTING SYMBOLS IN MULTIPLE PDSCH TRANSMISSION OCCASIONS

(71) Applicant: Telefonaktiebolaget LM Ericsson (publ), Stockholm (SE)

(72) Inventors: Shiwei Gao, Nepean (CA); Mattias Frenne, Uppsala (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/112,412

(22) Filed: Dec. 4, 2020

(65) Prior Publication Data
US 2021/0112583 A1    Apr. 15, 2021

Related U.S. Application Data

(63) Continuation of application No. PCT/IB2020/059660, filed on Oct. 14, 2020.
(Continued)

(51) Int. Cl.
*H04W 72/12* (2009.01)
*H04W 72/04* (2009.01)

(52) U.S. Cl.
CPC ... *H04W 72/1289* (2013.01); *H04W 72/0446* (2013.01)

(58) Field of Classification Search
CPC .................. H04W 72/1289; H04W 72/0446
See application file for complete search history.

(56) References Cited

U.S. PATENT DOCUMENTS

2019/0230689 A1    7/2019  Cao et al.
2019/0387557 A1    12/2019 Cai et al.
(Continued)

FOREIGN PATENT DOCUMENTS

WO    2018129770 A1    7/2018
WO    2019095941 A1    5/2019

OTHER PUBLICATIONS

Author Unknown, "Technical Specification Group Radio Access Network; NR; Physical layer procedures for data (Release 15)," Technical Specification 38.214, Version 15.7.0, 3GPP Organizational Partners, Sep. 2019, 105 pages.
(Continued)

*Primary Examiner* — Melvin C Marcelo
(74) *Attorney, Agent, or Firm* — Withrow & Terranova, PLLC

(57) ABSTRACT

Systems and methods related to indicating starting symbols of multiple transmission occasions in a cellular communications system are disclosed. In one embodiment, a method performed by a wireless communication device comprises receiving an indication of transmission occasions for respective downlink transmissions to the wireless communication device, at least two of the downlink transmissions associated to different transmission configuration indication states. The method further comprises receiving an indication of a starting symbol and a length of a first transmission occasion of the transmission occasions and receiving an indication of a particular offset value that is to be applied for determining a starting symbol of a second transmission occasion of the transmission occasions. The method further comprises determining a starting symbol of the second transmission occasion based on the starting symbol of the first transmission occasion, the length of the first transmission occasion, and the particular offset value.

24 Claims, 16 Drawing Sheets

Related U.S. Application Data

(60) Provisional application No. 62/915,463, filed on Oct. 15, 2019.

(56) References Cited

U.S. PATENT DOCUMENTS

| | | | |
|---|---|---|---|
| 2020/0178272 A1* | 6/2020 | Khoshnevisan | H04W 72/1263 |
| 2020/0280957 A1 | 9/2020 | Gao et al. | |
| 2020/0351892 A1* | 11/2020 | Yi | H04L 5/0092 |

OTHER PUBLICATIONS

Author Unknown, "Technical Specification Group Radio Access Network; NR; Radio Resource Control (RRC) protocol specification (Release 15)," Technical Specification 38.331, Version 15.7.0, 3GPP Organizational Partners, Sep. 2019, 526 pages.

Author Unknown, "Technical Specification Group Radio Access Network; NR; Multiplexing and channel coding (Release 16)," Technical Specification 38.212, Version 16.1.0, 3GPP Organizational Partners, Mar. 2020, 146 pages.

Author Unknown, "Technical Specification Group Radio Access Network; NR; Physical layer procedures for control (Release 16)," Technical Specification 38.213, Version 16.1.0, 3GPP Organizational Partners, Mar. 2020, 156 pages.

Author Unknown, "Technical Specification Group Radio Access Network; NR; Radio Resource Control (RRC) protocol specification (Release 16)," Technical Specification 38.331, Version 16.0.0, 3GPP Organizational Partners, Mar. 2020, 835 pages.

Huawei, "R1-1905649: Feature lead summary of HARQ enhancements for NR-U," Third Generation Partnership Project (3GPP), TSG RAN WG1 Meeting #96bis, Apr. 8-12, 2019, 29 pages, Xi'an, China.

International Search Report and Written Opinion for International Patent Application No. PCT/IB2020/059660, dated Jan. 13, 2021, 15 pages.

* cited by examiner

*Front-loaded DM-RS for configuration type 1 and type 2. CDM groups indicated by pattern*

An example of a NR Rel-16 Enhancement for PDSCH where multiple PDSCHs corresponding to different TCI states are received from multi-TRPs

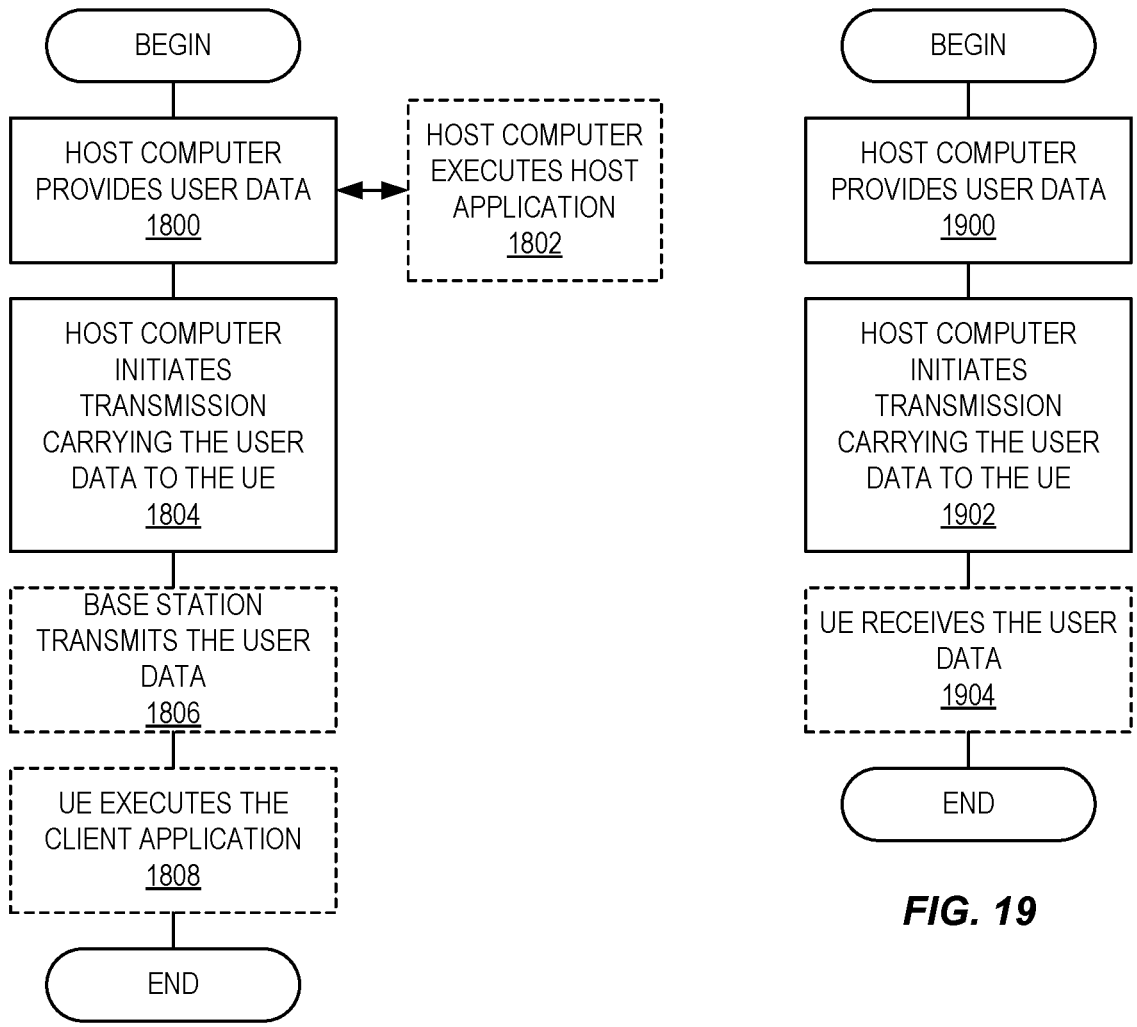

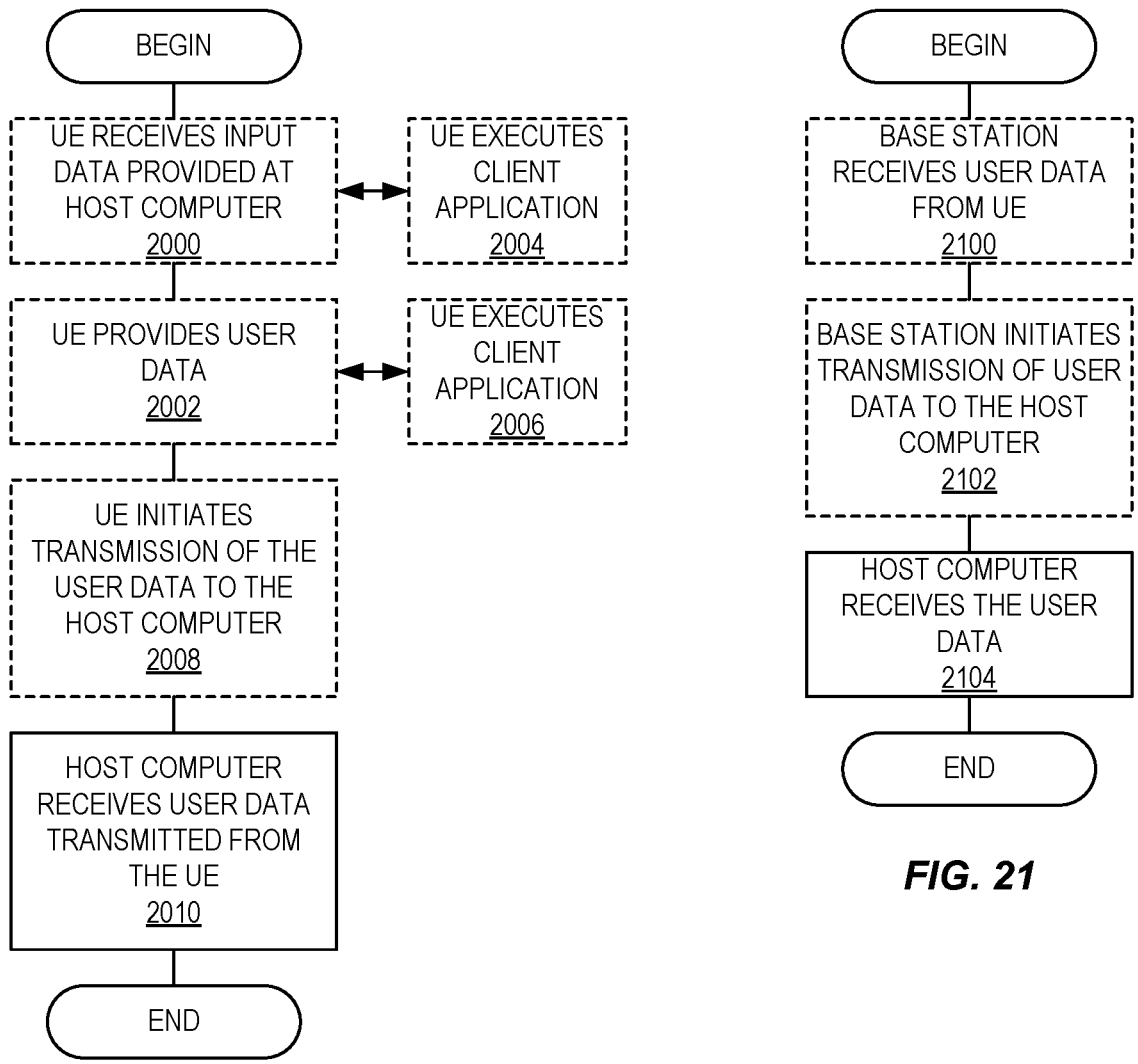

SYSTEMS AND METHODS FOR SIGNALING STARTING SYMBOLS IN MULTIPLE PDSCH TRANSMISSION OCCASIONS

RELATED APPLICATIONS

This application is a continuation of international patent application number PCT/IB2020/059660, filed Oct. 14, 2020, which claims the benefit of provisional patent application Ser. No. 62/915,463, filed Oct. 15, 2019, the disclosure of which is hereby incorporated herein by reference in its entirety.

TECHNICAL FIELD

The present disclosure relates to a cellular communications network and, more specifically, to slot-based and mini-slot based time multiplexing schemes for multi-Transmission/Reception Point (TRP) transmissions in a cellular communications system.

BACKGROUND

The new, or next, generation mobile wireless communication system (5G) or New Radio (NR) supports a diverse set of use cases and a diverse set of deployment scenarios. NR uses Cyclic Prefix Orthogonal Frequency Division Multiplexing (CP-OFDM) in the downlink and both CP-OFDM and Discrete Fourier Transform (DFT)-spread OFDM (DFT-S-OFDM) in the uplink. In the time domain, NR downlink and uplink physical resources are organized into equally-sized subframes of 1 millisecond (ms) each. A subframe is further divided into multiple slots of equal duration. The slot length depends on subcarrier spacing. For subcarrier spacing of $\Delta f = 15$ kilohertz (kHz), there is only one slot per subframe, and each slot always consists of 14 Orthogonal Frequency Division Multiplexing (OFDM) symbols, irrespective of the subcarrier spacing.

Typical data scheduling in NR is on a per slot basis. An example is shown in FIG. 1 for 15 kHz subcarrier spacing, where the first two symbols contain Physical Downlink Control Channel (PDCCH) and the remaining twelve symbols contain Physical Data Channel (PDCH), either a Physical Downlink Shared Channel (PDSCH) or a Physical Uplink Shared Channel (PUSCH).

Different subcarrier spacing (SCS) values are supported in NR. The supported SCS values, which are also referred to as different numerologies, are given by $\Delta f = (15 \times 2^\alpha)$ kHz where $\alpha \in (0,1,2,4,8)$. $\Delta f = 15$ kHz is the basic SCS that is also used in Long Term Evolution (LTE), where the corresponding slot duration is 1 ms. For a given SCS, the corresponding slot duration is $$\frac{1}{2^\alpha} \text{ ms.}$$

In the frequency domain physical resource definition, a system bandwidth is divided into Resource Blocks (RBs), each corresponds to twelve (12) contiguous subcarriers. The basic NR physical time-frequency resource grid is illustrated in FIG. 2, where only one RB within a 14-symbol slot is shown. One OFDM subcarrier during one OFDM symbol interval forms one Resource Element (RE).

Downlink transmissions can be dynamically scheduled, i.e., in each slot the NR base station (gNB) transmits Downlink Control Information (DCI) over PDCCH about which User Equipment (UE) data is to be transmitted to and which RBs and OFDM symbols in the current downlink slot the data is transmitted on. The term "min-slot" is sometime used when only a few OFDM symbols are used for a PDSCH transmission. However, a mini-slot may be any number of OFDM symbols from 1 to the number of OFDM symbols in a slot, but is preferably less than a full slot. PDCCH is typically transmitted in the first one or two OFDM symbols in each slot in NR. The UE data is carried on PDSCH. A UE first detects and decodes PDCCH and, if the decoding is successful, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant. The decoded control information in the uplink grant includes information such as modulation order, coding rate, uplink resource allocation, etc.

In NR Release 15, slot-aggregation is supported both for downlink and uplink transmissions, which is beneficial for enhancing the coverage and improving reliability. In this case, the PDSCH and PUSCH transmissions can be repeated in multiple slots when the Radio Resource Control (RRC) parameter for slot aggregation is configured. The corresponding RRC parameter is referred to as pdsch-AggregationFactor, pusch-AggregationFactor, and repK for PDSCH, grant-based PUSCH, and grant-free PUSCH, respectively. The relevant Information Elements (IEs) from 3GPP Technical Specification TS 38.331 are listed below to illustrate the usage of these parameters.

| PDSCH-Config information element | |
|---|---|
| -- ASN1START | |
| -- TAG-PDSCH-CONFIG-START | |
| PDSCH-Config ::= | SEQUENCE { |
| ... | |
|     resourceAllocation | ENUMERATED { |
|     resourceAllocationType0, resourceAllocationType1, dynamicSwitch}, | |
|     pdsch-TimeDomainAllocationList TimeDomainResourceAllocationList } Need M | SetupRelease { PDSCH- OPTIONAL, -- |
|     pdsch-AggregationFactor | ENUMERATED { n2, n4, n8 } |
| ... | |
| } | |

-continued

| PUSCH-Config information element | |
|---|---|
| PUSCH-Config ::= | SEQUENCE { |
| ... | |
| resourceAllocation | ENUMERATED { |
| resourceAllocationType0, resourceAllocationType1, dynamicSwitch}, | |
| pusch-TimeDomainAllocationList TimeDomainResourceAllocationList } Need M | SetupRelease { PUSCH- OPTIONAL, -- |
| pusch-AggregationFactor OPTIONAL, -- Need S | ENUMERATED { n2, n4, n8 } |
| ... | |
| } | |

| ConfiguredGrantConfig information element | |
|---|---|
| ConfiguredGrantConfig ::= | SEQUENCE { |
| ... | |
| repK | ENUMERATED {n1, n2, n4, n8}, |
| ... | |
| } | |

When a UE is scheduled by downlink (DL) assignment or DL Semi-Persistent Scheduling (SPS) for PDSCH transmission in a given slot, the signaled resource allocation for the PDSCH is used for a number of consecutive slots if aggregation factor is configured with a value larger than 1. In this case, the PDSCH is repeated with different redundancy versions in those slots for transmission of the corresponding transport blocks (TBs). The same procedure is applied for uplink (UL) where a UE is scheduled by UL assignment or grant-free for PUSCH transmission in a slot and is configured for slot aggregations. In this case, the UE uses the signaled resource allocation in the number of slots given by the aggregation factors using different redundancy versions for the transmission of corresponding TBs. The redundancy version to be applied on the $n^{th}$ transmission occasion of the TB is determined according to table below, where $rv_{id}$ is the RV identity number.

TABLE 5.1.2.1-2

Applied redundancy version when pdsch-AggregationFactor is present

| $rv_{id}$ indicated by the DCI scheduling the PDSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In NR Release 16, proposals for indicating the number of repetitions in DCI are being currently discussed. Some proposals in NR Release 16 include indicating the number of repetitions in a newly introduced DCI field. Some other proposals in NR Release 16 include indicating the number of repetitions using an existing DCI field such as the Time Domain Resource Allocation (TDRA) field.

In NR Release 15, the TDRA information for a PDSCH transmission in a slot includes information such that the UE can determine the slot that the PDSCH is expected to be received (i.e., K0), the starting symbol in the slot for PDSCH reception, and the length or duration of PDSCH reception (i.e., the Start and Length Indicator Value (SLIV)). The UE is also provided with the mapping type which is used to determine the Demodulation Reference Signal (DMRS) positions. In NR, there are TDRA tables specified consisting of different combinations of K0, SLIV, etc. The UE can be signaled an index to a row in the table that provides information on K0 and SLIV to be used for reception.

A similar procedure is applied for PUSCH transmissions where the slot intended for PUSCH transmission is obtained from a field in UL assignment, given by K2. The SLIV information is provided similarly to DL reception as well as the mapping type by UL assignment and/or configuration.

The TDRA is the time domain resource allocation for the first instant of PDSCH reception or PUSCH transmissions. As mentioned previously, if the UE is configured with an aggregation factor, the transmission in that slot is repeated in multiple slots based on the aggregation factor.

The relevant IEs from 3GPP TS 38.331 are listed below to illustrate the usage of these parameters.

| PDSCH-TimeDomainResourceAllocationList information element |
|---|
| -- ASN1START |
| -- TAG-PDSCH-TIMEDOMAINRESOURCEALLOCATIONLIST-START |
| PDSCH-TimeDomainResourceAllocationList ::= SEQUENCE (SIZE(1..maxNrofDL-Allocations)) OF PDSCH-TimeDomainResourceAllocation |
| PDSCH-TimeDomainResourceAllocation ::= SEQUENCE { |
|     k0                          INTEGER(0..32) |
|     OPTIONAL, -- Need S |

-continued

```
    mappingType              ENUMERATED {typeA, typeB},
    startSymbolAndLength     INTEGER (0..127)
}
-- TAG-PDSCH-TIMEDOMAINRESOURCEALLOCATIONLIST-STOP
-- ASN1STOP
```

PDSCH-TimeDomainResourceAllocation field descriptions k0
The n1 corresponds to the value 1, n2 corresponds to value 2, and so on.
Corresponds to L1 parameter 'K0' (see 38.214, section 5.1.2.1) When the field is absent the UE applies the value 0.
mappingType
PDSCH mapping type. (see 38.214, section 5.3)
startSymbolAndLength
An index giving valid combinations of start symbol and length (jointly encoded) as start and length indicator (SLIV). The network configures the field so that the allocation does not cross the slot boundary.
Corresponds to L1 parameter 'Index-start-len' (see 38.214, section 5.1.2.1)

Several signals can be transmitted from the same base station antenna from different antenna ports. These signals can have the same large-scale properties, for instance in terms of Doppler shift/spread, average delay spread, or average delay. These antenna ports are then said to be quasi co-located (QCL).

The network can then signal to the UE that two antenna ports are QCL. If the UE knows that two antenna ports are QCL with respect to a certain parameter (e.g. Doppler spread), the UE can estimate that parameter based on one of the antenna ports and use that estimate when receiving the other antenna port. Typically, the first antenna port is represented by a measurement reference signal such as Channel State Information Reference Signal (CSI-RS) (known as source RS) and the second antenna port is a DMRS (known as target RS).

For instance, if antenna ports A and B are QCL with respect to average delay, the UE can estimate the average delay from the signal received from antenna port A (known as the source reference signal (RS)) and assume that the signal received from antenna port B (target RS) has the same average delay. This is useful for demodulation since the UE can know beforehand the properties of the channel when trying to measure the channel utilizing the DMRS.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. Note that for beam management, the discussion mostly revolves around QCL Type D, but it is also necessary to convey a Type A QCL relation for the RSs to the UE, so that it can estimate all the relevant large-scale parameters.

Typically this is achieved by configuring the UE with a CSI-RS for tracking (TRS) for time/frequency offset estimation. To be able to use any QCL reference, the UE would have to receive it with a sufficiently good Signal to Interference plus Noise Ratio (SINR). In many cases, this means that the TRS has to be transmitted in a suitable beam to a certain UE.

To introduce dynamics in beam and transmission/reception point (TRP) selection, the UE can be configured through RRC signaling with N Transmission Configuration Indication (TCI) states, where N is up to 128 in frequency range 2 (FR2) and up to 8 in FR1, depending on UE capability. Each TCI state contains QCL information, i.e. one or two source DL RSs, each source RS associated with a QCL type. For example, a TCI state contains a pair of reference signals, each associated with a QCL type, e-g-two different CSI-RSs {CSI-RS1, CSI-RS2} is configured in the TCI state as {qcl-Type1,qcl-Type2}={Type A, Type D}. This means the UE can derive Doppler shift, Doppler spread, average delay, delay spread from CSI-RS1 and Spatial Rx parameter (i.e. the RX beam to use) from CSI-RS2. In case type D (spatial information) is not applicable, such as low or midband operation, then a TCI state contains only a single source RS. Each of the N states in the list of TCI states can be interpreted as a list of N possible beams transmitted from the network or a list of N possible TRPs used by the network to communicate with the UE.

A first list of available TCI states is configured for PDSCH, and a second list for PDCCH contains pointers, known as TCI State IDs, to a subset of the TCI states configured for PDSCH. The network then activates one TCI state for PDCCH (i.e. provides a TCI for PDCCH) and up to M active TCI states for PDSCH. The number M of active TCI states the UE can support is a UE capability but the maximum in NR Rel-15 is 8. Each configured TCI state contains parameters for the quasi co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with four active TCI states from a list of sixty-four (64) total configured TCI states. Hence, sixty (60) TCI states are inactive, and the UE need not be prepared to have large scale parameters estimated for those. But the UE continuously tracks and updates the large-scale parameters for the four active TCI states by measurements and analysis of the source RSs indicated by each TCI state.

In NR Release 15, when scheduling a PDSCH to a UE, the DCI contains a pointer to one active TCI. The UE then knows which large-scale parameter estimate to use when performing PDSCH DMRS channel estimation and thus PDSCH demodulation.

DMRS are used for coherent demodulation of physical layer data channels, PDSCH (DL) and PUSCH (UL), as well as of PDCCH. The DMRS is confined to resource blocks carrying the associated physical layer channel and is mapped on allocated resource elements of the OFDM time-frequency grid such that the receiver can efficiently handle time/frequency-selective fading radio channels.

The mapping of DMRS to resource elements is configurable in both frequency and time domain, with two mapping types in the frequency domain (configuration type 1 or type 2) and two mapping types in the time domain (mapping type A or type B) defining the symbol position of the first DMRS within a transmission interval. The DMRS mapping in time domain can further be single-symbol based or double-symbol based where the latter means that DMRS is mapped in pairs of two adjacent symbols. Furthermore, a UE can be configured with one, two, three, or four single-symbol DMRS and one or two double-symbol DMRS. In scenarios with low Doppler, it may be sufficient to configure front-loaded DMRS only, i.e. one single-symbol DMRS or one double-symbol DMRS, whereas in scenarios with high Doppler additional DMRS will be required.

FIG. 3 shows the mapping of front-loaded DMRS for configuration type 1 and type 2 with single-symbol and double-symbol DMRS and for the mapping type A with first DMRS in third symbol of a transmission interval of fourteen symbols. We observe from this figure that type 1 and type 2 differs with respect to both the mapping structure and the number of supported DMRS Code Division Multiplexing (CDM) groups where type 1 support 2 CDM groups and Type 2 support 3 CDM groups.

A DMRS antenna port is mapped to the resource elements within one CDM group only. For single-symbol DMRS, two antenna ports can be mapped to each CDM group whereas for double-symbol DMRS four antenna ports can be mapped to each CDM group. Hence, the maximum number of DMRS ports is for type 1 either four or eight and for type 2 it is either six or twelve. An Orthogonal Cover Code (OCC) of length 2 ([+1, +1], [+1, −1]) is used to separate antenna ports mapped on same resource elements within a CDM group. The OCC is applied in frequency domain as well as in time domain when double-symbol DM-RS is configured.

In NR Release 16, there are ongoing specifications enhancement for Ultra Reliable and Low Latency Communication (URLLC) with packet error rates down to 10^-5. For these services, an alternative Modulation and Coding Scheme (MCS) table can be configured to be used for PDSCH or PUSCH scheduling, which gives more robust reception of the data payload.

In NR Release 16, there are discussions ongoing on the support of PDSCH with multi-TRP. One mechanism that is being considered in NR Release 16 is a single PDCCH scheduling one or multiple PDSCH from different TRPs. The single PDCCH is received from one of the TRPs. FIG. 4 shows an example where a DCI received by the UE in PDCCH from TRP1 schedules two PDSCHs. The first PDSCH (PDSCH1) is received from TRP1 and the second PDSCH (PDSCH2) is received from TRP2. Alternatively, the single PDCCH schedules a single PDSCH where PDSCH layers are grouped into two groups and where layer group 1 is received from TRP1 and layer group 2 is received from TRP2. In such cases, each PDSCH or layer group is transmitted from a different TRP has a different TCI state associated with it. In the example of FIG. 4, PDSCH1 is associated with TCI State p, and PDSCH 2 is associated with TCI state q.

In the RAN1 Ad Hoc meeting in January 2019, the following was agreed:

| Agreement |
| --- |
| TCI indication framework shall be enhanced in Rel-16 at least foreMBB:<br>    ● Each TCI code point in a DCI can correspond to 1 or 2TCI states<br>        ○ When 2 TCI states are activated within a TCI code point, each TCI state corresponds to one CDM group, at least for DMRS type 1<br>            ● FFS design for DMRS type 2<br>        ○ FFS: TCI field in DCI, and associated MAC-CE signaling impact |

According to the above agreement, each codepoint in the DCI Transmission Configuration Indication field can be mapped to either 1 or 2 TCI states. This can be interpreted as follows:

"A DCI in PDCCH schedules 1 or 2 PDSCHs (or 1 or 2 layer groups if a single PDSCH) where each PDSCH or layer group is associated with a different TCI state; the codepoint of the Transmission Configuration Indication field in DCI indicates the 1-2 TCI states associated with the 1 or 2 PDSCHs or layer groups scheduled." In this case, the two DMRS of the two PDSCHs or the two layer groups respectively are not mapped to the same DMRS CDM group.

It should be noted that in FR2 operation, a single PDCCH that is received by a UE using one TCI state with QCL type D (for example, single PDCCH received using one received beam) may indicate one or more PDSCHs associated with another TCI state with QCL type D (for example, one of the PDSCHs received using another received beam). In this case, the UE needs to switch beams from the point of receiving the last symbol of the single PDCCH to the point of receiving the first symbol of the PDSCH. Such beam switching delays are counted in terms of number of OFDM symbols. For example, at 60 kHz subcarrier spacing, the beam switching delay can be 7 symbols; at 120 kHz subcarrier spacing, the beam switching delay can be 14 symbols.

For multi-TRP based PDSCH transmission, different schemes are being considered in NR Release 16. One of the schemes that is already agreed involves slot-based time multiplexing the different PDSCHs transmitted from multiple TRPs. An example of a NR Release 16 slot-based time-multiplexed PDSCHs from two TRPs where each PDSCH is associated with a different TCI state is shown in FIG. 5. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are time multiplexed in different slots, the DMRS corresponding to the two PDSCHs are transmitted in non-overlapping resources (i.e., different slots). Hence, the DMRSs for the two PDSCHs can use the same CDM group or even exactly the same antenna ports in each of the slots. In the example of FIG. 5, DMRS for PDSCH 1 is transmitted using CDM group 0 in slot n, while DM-RS for PDSCH 2 is transmitted using CDM group 0 in slot n+1. In NR Release 16, the scheme of slot-based time-multiplexed PDSCHs associated with different TCI states is useful for URLLC.

Another scheme that has been agreed involves mini-slot-based time multiplexing, which is also known as PDSCH Type B scheduling in NR specifications, the different PDSCHs transmitted from multiple TRPs. An example of a NR Release 16 mini-slot-based time-multiplexed PDSCHs from two TRPs where each PDSCH is associated with a different TCI state is shown in FIG. 6. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are time multiplexed in different mini-slots, the DMRS corresponding to the two PDSCHs are transmitted in non-overlapping resources (i.e., different mini-slots). Hence, the DMRSs for the two PDSCHs can use the same CDM group or even the same antenna ports in each mini-slot. In the example of FIG. 6, DMRS for PDSCH 1 is transmitted using CDM group 0 in mini-slot n, while DMRS for PDSCH 2 is transmitted using CDM group 0 in mini-slot n+1. In NR Release 16, the scheme of mini-slot-based time-multiplexed PDSCHs associated with different TCI states is being considered for URLLC.

Note that the PDSCHs transmitted from the two TRPs in the slot-based and mini-slot based time multiplexing schemes in FIG. 5 and FIG. 6 may correspond to the same or different redundancy versions of the same TB (i.e., repetitions). Hence, the UE can do soft combining of the two PDSCHs transmitted from the two TRPs to achieve more reliable reception. Even though the examples in FIG. 5 and FIG. 6 show two repetitions over two TRPs, the slot-based and mini-slot based time multiplexing schemes are also applicable to cases with N>2 repetitions over M>1 TRPs. Throughout this disclosure, the terms 'PDSCH transmission occasions' and 'PDSCH repetitions' mean the same.

There currently exist certain challenge(s). Even though the slot-based and mini-slot based time multiplexing schemes are agreed for multi-TRP, the signaling details for indicating starting symbols for the multiple PDSCH transmission occasions (i.e., repetitions) is still an open problem particularly for the mini-slot based time multiplexing scheme (i.e., transmitting multiple transmission occasions corresponding to multiple TCI states). Without knowing the starting symbols of the multiple PDSCH transmission occasions, the UE will not know the time domain resource allocation for the multiple transmission occasions.

SUMMARY

Systems and methods related to indicating starting symbols of multiple transmission occasions in a cellular communications system are disclosed. In one embodiment, a method performed by a wireless communication device comprises receiving an indication of a plurality of transmission occasions for a respective plurality of downlink transmissions to the wireless communication device, at least two of the plurality of downlink transmissions associated with different transmission configuration indication states. The method further comprises receiving an indication of a starting symbol and a length of a first transmission occasion of the plurality of transmission occasions and receiving an indication of a particular offset value that is to be applied for determining a starting symbol of a second transmission occasion of the plurality of transmission occasions. The method further comprises determining a starting symbol of the second transmission occasion based on the starting symbol of the first transmission occasion, the length of the first transmission occasion, and the particular offset value. In this manner, an efficient way of signaling the starting symbols for multiple transmission occasions is provided.

In one embodiment, determining the starting symbol of the second transmission occasion comprises determining the starting symbol of the second transmission occasion is S+L+K, where S is the starting symbol of the first transmission occasion, L is the length of the first transmission occasion, and K is the particular offset value.

In one embodiment, the plurality of transmission occasions is a plurality of physical downlink shared channel (PDSCH) transmission occasions, and the plurality of downlink transmissions are either a plurality of repetitions of a same data transmission or different layers of a single data transmission.

In one embodiment, the plurality of transmission occasions are in a single slot.

In one embodiment, the first transmission occasion is a first of the plurality transmission occasions in time, and the second transmission occasion is a second of the plurality of transmission occasions in time.

In one embodiment, receiving the indication of the particular offset value comprises receiving the indication of the particular offset value via Radio Resource Control (RRC) signaling. In one embodiment, the indication of the particular offset value is an indication of one of a set of predefined candidate offset values.

In one embodiment, the method further comprises receiving an indication of a set of possible offset values, wherein receiving the indication of the particular offset value comprises receiving an indication of one of the set of possible offset values as the particular offset value. In one embodiment, receiving the indication of the set of possible offset values comprises receiving the indication of the set of possible offset values via higher layer signaling. In one embodiment, receiving the indication of one of the set of possible offset values as the particular offset value comprises receiving the indication of one of the set of possible offset values via a downlink control information (DCI) that schedules the plurality of downlink transmissions.

In one embodiment, receiving the indication of the start and the length of the first transmission occasion comprises receiving the indication of the start and the length of the first transmission occasion via a time domain resource allocation (TDRA) field in a DCI that schedules the plurality of downlink transmissions. In one embodiment, receiving the indication of the particular offset value comprises receiving (1006) the indication of the particular offset value via a field in the DCI that schedules the plurality of downlink transmissions.

In one embodiment, receiving the indication of the plurality of transmission occasions comprises receiving the indication of the plurality of transmission occasions via a transmission configuration indication (TCI) field in a DCI that schedules the plurality of downlink transmissions, the TCI field indicating a codepoint that indicates more than one TCI state and thus more than one transmission occasion.

In one embodiment, receiving the indication of the particular offset value comprises receiving the indication of the particular offset value via a field in a DCI that schedules the plurality of downlink transmissions.

In one embodiment, receiving the indication of the plurality of transmission occasions comprises receiving a DCI that schedules the plurality of downlink transmissions in the plurality of transmission occasions in a same slot, wherein the DCI comprises the indication of the plurality of transmission occasions. In one embodiment, the indication of the starting symbol and the length of the first transmission occasion is further comprised in the DCI. In one embodiment, the indication of the particular offset value is further comprised in the DCI.

In one embodiment, the method further comprises receiving the plurality of downlink transmissions in the plurality of transmission occasions, wherein receiving the plurality of downlink transmissions in the plurality of transmission occasions comprises receiving a second downlink transmission in the second transmission occasion based on the determined starting symbol of the second transmission occasion.

Corresponding embodiments of a wireless communication device are also disclosed. In one embodiment, a wireless communication device is adapted to receive an indication of a plurality of transmission occasions for a respective plurality of downlink transmissions to the wireless communication device, at least two of the plurality of downlink transmissions associated to different transmission configuration indication states. The wireless communication device is further adapted to receive an indication of a starting symbol and a length of a first transmission occasion of the plurality of transmission occasions and receive an indication of a particular offset value that is to be applied for determining a starting symbol of a second transmission occasion of the plurality of transmission occasions. The wireless communication device is further adapted to determine a starting symbol of the second transmission occasion based on the starting symbol of the first transmission occasion, the length of the first transmission occasion, and the particular offset value.

In one embodiment, a wireless communication device comprises one or more transmitters, one or more receivers, and processing circuitry associated with the one or more transmitters and the one or more receivers. The processing circuitry is configured to cause the wireless communication device to receive an indication of a plurality of transmission occasions for a respective plurality of downlink transmissions to the wireless communication device, at least two of the plurality of downlink transmissions associated to different transmission configuration indication states. The processing circuitry is further configured to cause the wireless communication device to receive an indication of a starting symbol and a length of a first transmission occasion of the plurality of transmission occasions and receive an indication of a particular offset value that is to be applied for determining a starting symbol of a second transmission occasion of the plurality of transmission occasions. The processing circuitry is further configured to cause the wireless communication device to determine a starting symbol of the second transmission occasion based on the starting symbol of the first transmission occasion, the length of the first transmission occasion, and the particular offset value.

In another embodiment, a method performed by a wireless communication device comprises receiving a DCI that schedules a plurality of transmission occasions for a respective plurality of downlink transmissions to the wireless communication device in a single slot. The DCI comprises information that indicates that at least two of the plurality of downlink transmissions are associated to different transmission configuration indication states and information that indicates a starting symbol and a length of a first transmission occasion of the plurality of transmission occasions. The method further comprises determining a starting symbol of a second transmission occasion of the plurality of transmission occasions based on the starting symbol of the first transmission occasion, the length of the first transmission occasion, and a particular offset value. The particular offset value is a value indicated to the wireless communication device if the wireless communication device has received an indication of the particular offset value and a predefined value if the wireless communication device has not received an indication of the particular offset value.

In one embodiment, the predefined value for the particular offset value is zero.

In one embodiment, the particular offset value is the value indicated to the wireless communication device if the wireless communication device has received an indication of the particular offset value via RRC signaling and the predefined value if the wireless communication device has not received an indication of the particular offset value via RRC signaling.

In one embodiment, the method further comprises receiving the plurality of downlink transmissions in the plurality of transmission occasions in accordance with the DCI, wherein receiving the plurality of downlink transmissions in the plurality of transmission occasions comprises receiving a second downlink transmission in the second transmission occasion based on the determined starting symbol of the second transmission occasion.

Corresponding embodiments of a wireless communication device are also disclosed. In one embodiment, a wireless communication device is adapted to receive a DCI that schedules a plurality of transmission occasions for a respective plurality of downlink transmissions to the wireless communication device in a single slot. The DCI comprises information that indicates that at least two of the plurality of downlink transmissions are associated to different transmission configuration indication states and information that indicates a starting symbol and a length of a first transmission occasion of the plurality of transmission occasions. The wireless communication device is further adapted to determine a starting symbol of a second transmission occasion of the plurality of transmission occasions based on the starting symbol of the first transmission occasion, the length of the first transmission occasion, and a particular offset value. The particular offset value is a value indicated to the wireless communication device if the wireless communication device has received an indication of the particular offset value and a predefined value if the wireless communication device has not received an indication of the particular offset value.

In one embodiment, a wireless communication device comprises one or more transmitters, one or more receivers, and processing circuitry associated with the one or more transmitters and the one or more receivers. The processing circuitry is configured to cause the wireless communication device to receive a DCI that schedules a plurality of transmission occasions for a respective plurality of downlink transmissions to the wireless communication device in a single slot. The DCI comprises information that indicates that at least two of the plurality of downlink transmissions are associated to different transmission configuration indication states and information that indicates a starting symbol and a length of a first transmission occasion of the plurality of transmission occasions. The processing circuitry is further configured to cause the wireless communication device to determine a starting symbol of a second transmission occasion of the plurality of transmission occasions based on the starting symbol of the first transmission occasion, the length of the first transmission occasion, and a particular offset value. The particular offset value is a value indicated to the wireless communication device if the wireless communication device has received an indication of the particular offset value and a predefined value if the wireless communication device has not received an indication of the particular offset value.

Embodiments of a method performed by a base station are also disclosed. In one embodiment, a method performed by a base station for signaling a starting symbol of a plurality of transmission occasions comprises sending, to a wireless communication device, an indication that there are multiple transmission occasions and sending, to the wireless communication device, an indication of a starting symbol S and a length L of a first transmission occasion. The method further comprises sending, to the wireless communication device, an indication of a particular offset value K that is to be applied for determining a starting symbol of a second transmission occasion.

In one embodiment, the starting symbol of the second transmission occasion is S+L+K.

In one embodiment, the multiple transmission occasions are multiple PDSCH transmission occasions.

In one embodiment, the multiple transmission occasions are in the same slot.

In one embodiment, the first transmission occasion is the first transmission occasion from among the multiple transmission occasions. In one embodiment, the second transmission occasion is the second transmission occasion from among the multiple transmission occasions.

In one embodiment, the method further comprises sending, to the wireless communication device, an indication of a set of possible offset values, wherein sending the indication of the particular offset value K comprises sending an indication of one of the set of possible offset values as the particular offset value K. In one embodiment, sending the indication of the set of possible offset values comprises sending the indication of the set of possible offset values via higher layer signaling.

In one embodiment, sending the indication that there are multiple transmission occasions comprises sending the indication that there are multiple transmission occasions via a TCI field in a DCI which indicates two transmission occasions when there are more than 1 TCI state indicated by a codepoint in the TCI field.

In one embodiment, sending the indication of the start S and the length L of the first transmission occasion comprises sending the indication of the start S and the length L of the first transmission occasion via a TDRA field in DCI.

In one embodiment, sending the indication of the particular offset value K comprises sending the indication of the particular offset value K via a field in a DCI.

In one embodiment, the method further comprises sending, to the wireless communication device, a DCI message that schedules the multiple transmission occasions in a same slot, wherein the DCI message comprises the indication that there are multiple transmission occasions and that indication of the starting symbol S and the length L of the first transmission occasion. In one embodiment, the DCI message further comprises the indication of the particular offset value K.

Corresponding embodiments of a base station are also disclosed. In one embodiment, a base station for signaling a starting symbol of a plurality of transmission occasions is adapted to send, to a wireless communication device, an indication that there are multiple transmission occasions and send, to the wireless communication device, an indication of a starting symbol S and a length L of a first transmission occasion. The base station is further adapted to send, to the wireless communication device, an indication of a particular offset value K that is to be applied for determining a starting symbol of a second transmission occasion.

In one embodiment, a base station for signaling a starting symbol of a plurality of transmission occasions comprises processing circuitry configured to cause the base station to send, to a wireless communication device, an indication that there are multiple transmission occasions and send, to the wireless communication device, an indication of a starting symbol S and a length L of a first transmission occasion. The processing circuitry is further configured to cause the base station send, to the wireless communication device, an indication of a particular offset value K that is to be applied for determining a starting symbol of a second transmission occasion.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 18 through 21 are flow charts that illustrate example embodiments of methods implemented in a communication system such as that of FIG. 16.

DETAILED DESCRIPTION

Figure 1:
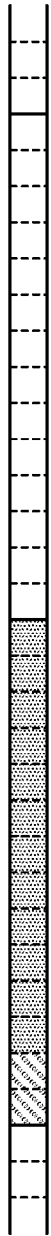
FIG. 1 illustrates an example of typical data scheduling in New Radio (NR) on a per slot basis.
Figure 2:
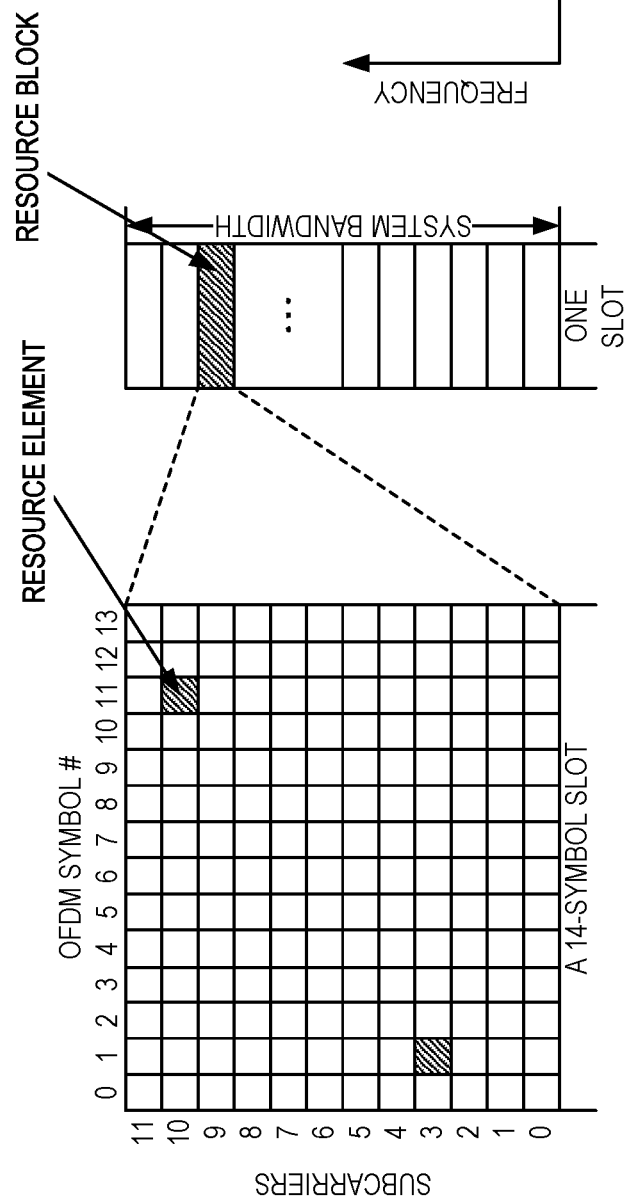
FIG. 2 illustrates the basic NR physical time-frequency resource grid.
Figure 3:
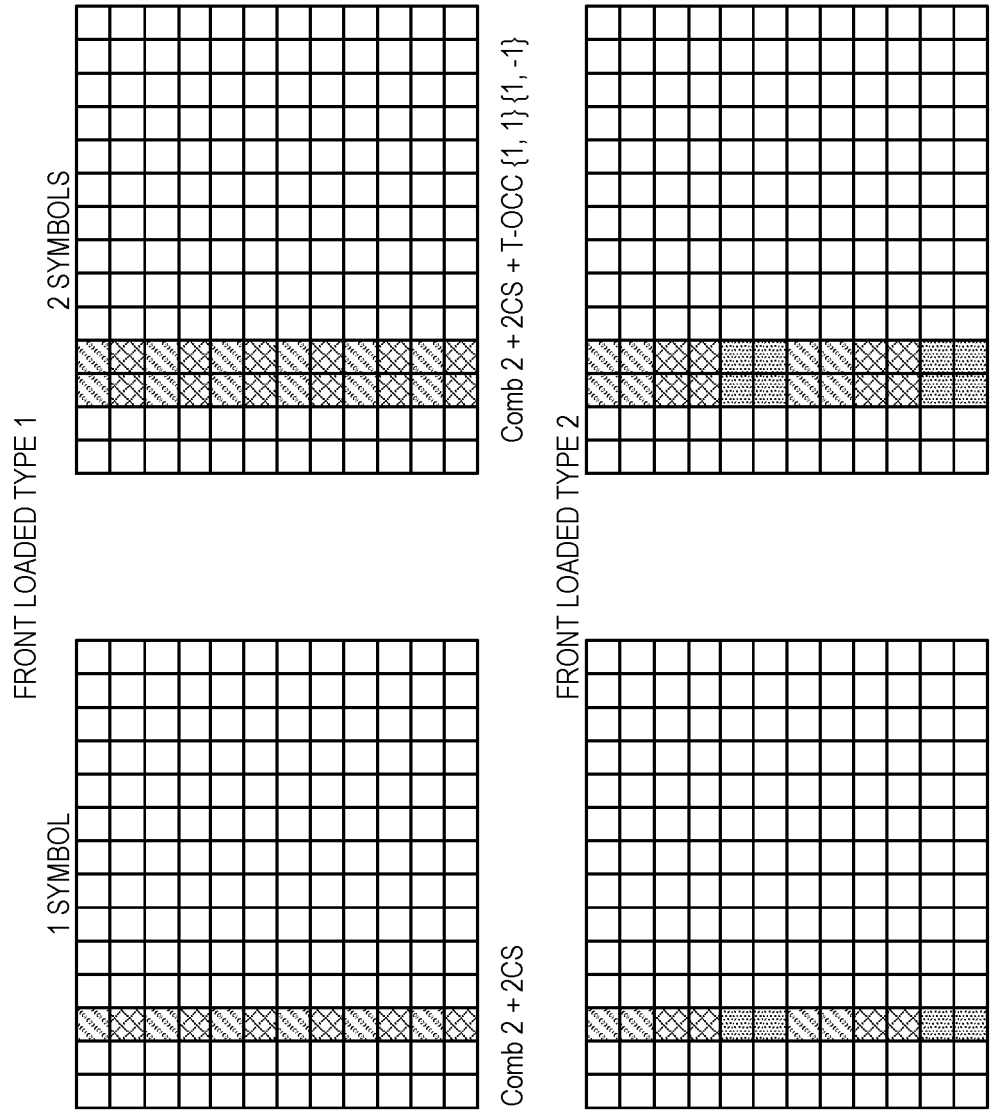
FIG. 3 shows the mapping of front-loaded Demodulation Reference Signal (DMRS) for configuration type 1 and type 2 with single-symbol and double-symbol DMRS and for the mapping type A with first DMRS in third symbol of a transmission interval of fourteen symbols.
Figure 4:
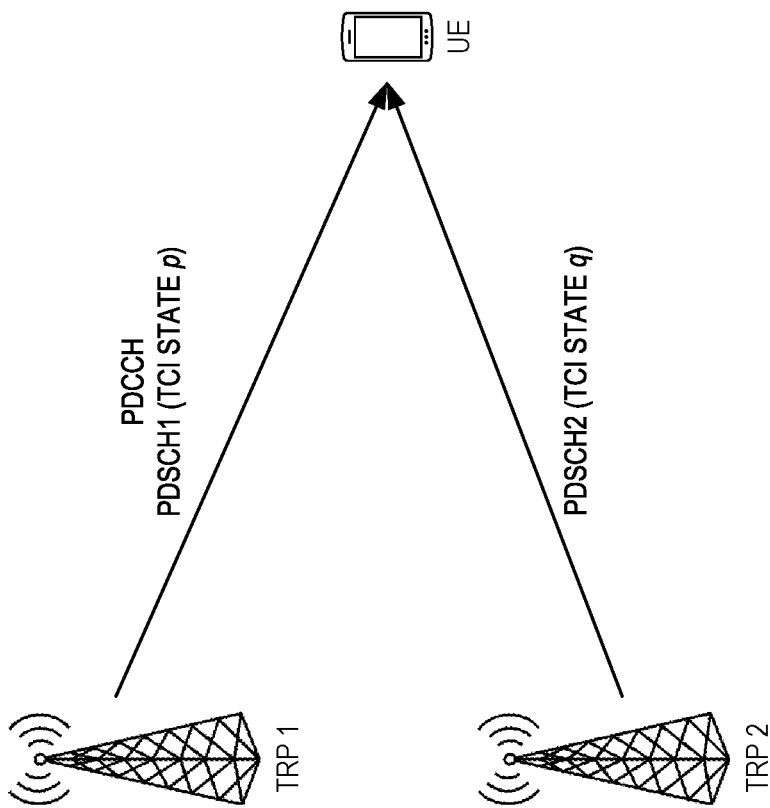
FIG. 4 shows an example where a Downlink Control Information (DCI) received by the User Equipment (UE) in a Physical Downlink Control Channel (PDCCH) from a first Transmission/Reception Point (TRP) schedules two Physical Downlink Shared Channels (PDSCHs), one from the first TRP and another from a second TRP.
Figure 5:
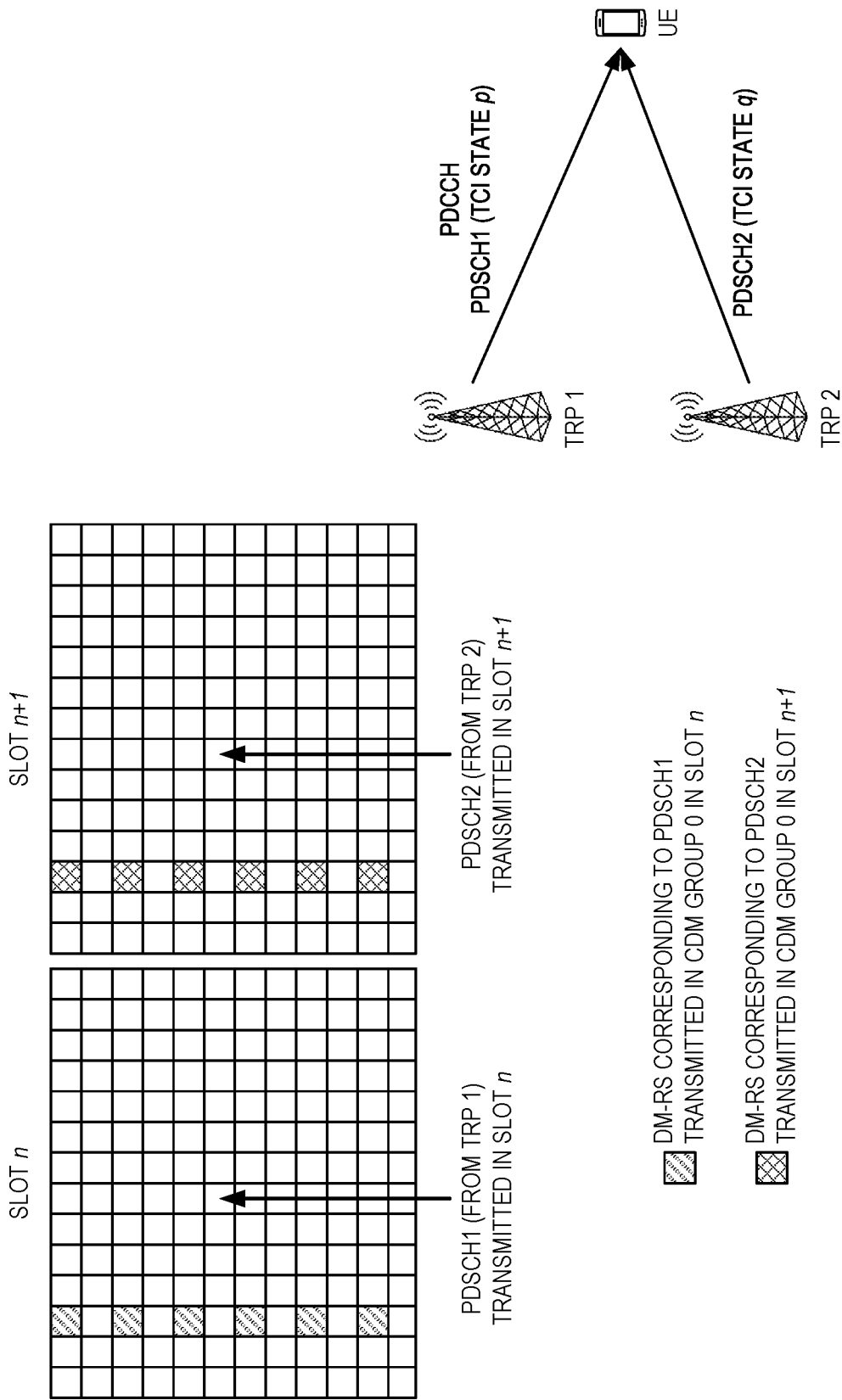
FIG. 5 illustrates an example of a NR Release 16 slot-based time-multiplexed PDSCHs from two TRPs where each PDSCH is associated with a different Transmission Configuration Indication (TCI) state.
Figure 6:
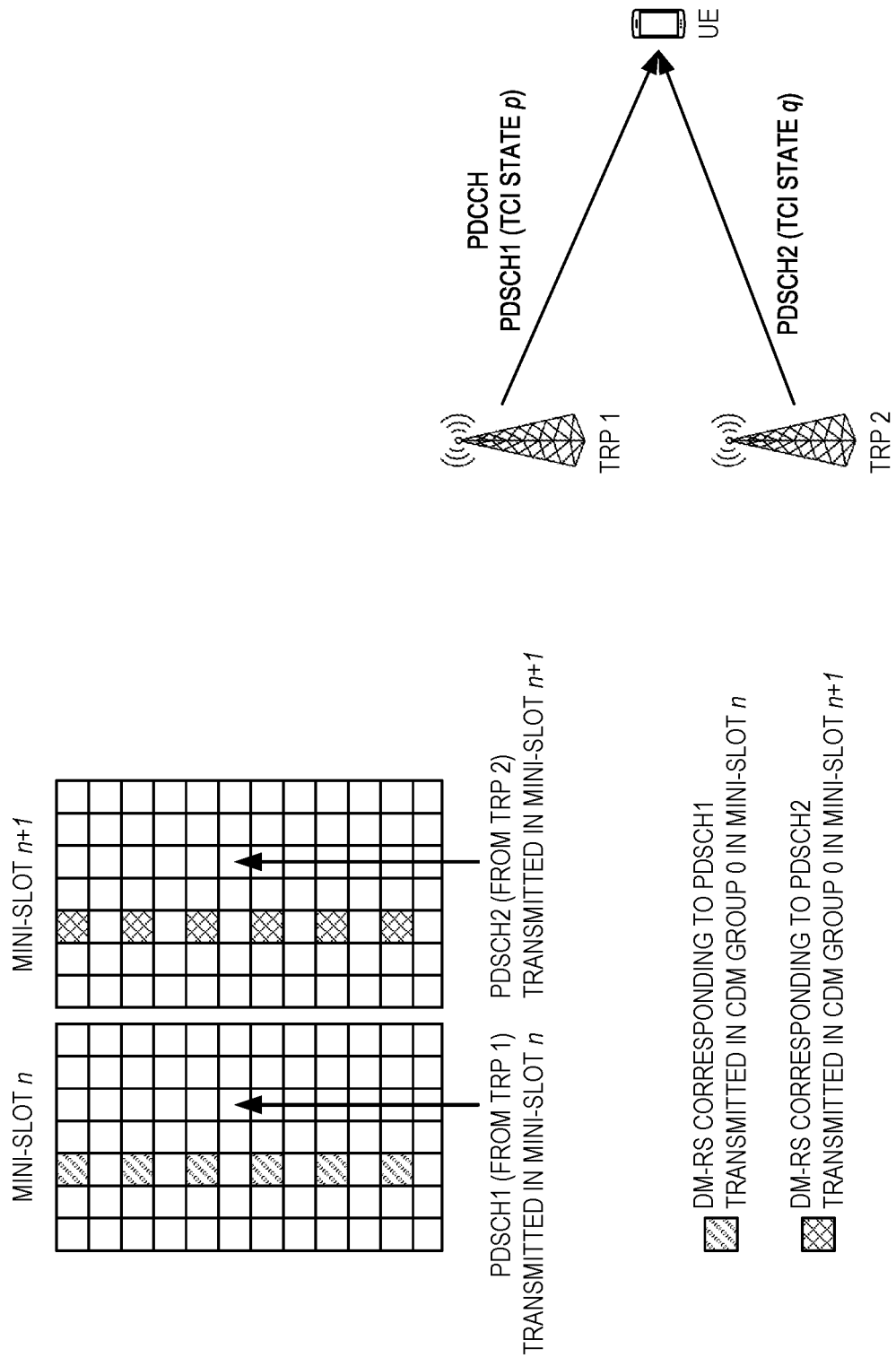
FIG. 6 illustrates an example of a NR Release 16 mini-slot-based time-multiplexed PDSCHs from two TRPs where each PDSCH is associated with a different TCI state.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, there currently exist certain challenge(s) with respect to slot-based and mini-slot based time multiplexing schemes for multi-TRP transmissions in a cellular communications system such as, e.g., the 3GPP NR system. Even though the slot-based and mini-slot based time multiplexing schemes are agreed in NR for multi-TRP, the signaling details for indicating starting symbols for the multiple Physical Downlink Shared Channel (PDSCH) transmission occasions (i.e., repetitions) is still an open problem particularly for the mini-slot based time multiplexing scheme (i.e., transmitting multiple transmission occasions corresponding to multiple Transmission Configuration Indication (TCI) states). Without knowing the starting symbols of the multiple PDSCH transmission occasions, the UE will not know the time domain resource allocation for the multiple transmission occasions.

Certain aspects of the present disclosure and their embodiments may provide solutions to the aforementioned or other challenges. Some example embodiments of the present disclosure are as follows. In a first example embodiment, a method performed by a wireless communication device (e.g., a UE) for determining a starting symbol of a plurality of transmission occasions (e.g., PDSCH transmission occasions, e.g., in a same slot) comprises one or more of:

a) (optional) receiving (e.g., from a radio access node, e.g., a base station) an indication of a set of possible K values, where a K value is an offset value;

b) receiving (e.g., from a radio access node, e.g., a base station) an indication that there are multiple transmission occasions (e.g., in a same slot);

c) receiving (e.g., from a radio access node, e.g., a base station) an indication of a starting symbol S and a length L of a first transmission occasion (e.g., a first transmission occasion from among a plurality of transmission occasions in the same slot);

d) receiving an indication of a particular K value (e.g., an indication of one of the set of possible K values if (a) is performed and, optionally, if the set of possible K values includes more than one possible K value) that is to be applied for determining a starting symbol of a second transmission occasion (e.g., a second transmission occasion from among the plurality of transmission occasions in the same slot);

e) determining the starting symbol of the second transmission occasion (e.g., as S+L+K).

A second example embodiment is the same as the first example embodiment but wherein the indication of the set of possible K values is received via higher layer signaling (e.g., Radio Resource Control (RRC) signaling).

A third example embodiment is the same as the first or second embodiment but wherein the indication that there are multiple transmission occasions is received via a TCI field in a DCI which indicates two transmission occasions when there are more than one TCI state indicated by a codepoint in the TCI field.

A fourth example embodiment is the same as the first, second, or third embodiment but wherein the indication of the start S and the length L of the first transmission occasion is via a Time Domain Resource Allocation (TDRA) field in Downlink Control Information (DCI).

A fifth example embodiment is the same as the first, second, third, or fourth embodiment but wherein the indication of the particular K value is via a field in DCI.

Certain embodiments may provide one or more of the following technical advantage(s). Some embodiments of the proposed solution(s) may provide efficient ways of signaling starting symbols for the multiple PDSCH transmission occasions to the UE. With the signaling proposed in some embodiments of the present disclosure, the UE may know where a first transmission occasion starts/ends, and where the next transmission occasion starts/ends.

For example, looking at the first through fifth example embodiments described above, there are several benefits to higher layer configuring (e.g., via RRC) at least one offset value K in the first indication in the first and second example embodiments. One solution is to always use a fixed value of K where the fixed value of K can be predefined in specifications. However, the proposed methods in the first example embodiment (including step a) and the second example embodiment may offer several advantages to merely fixing the value of K The advantages are listed below:

In NR, some slots may have reference signals (e.g., the NR Tracking Reference Signal (TRS)) configured at a given symbol position(s) within the slot. For example, consider an example where the first transmission occasion has starting symbol S=0 and length L=5, and there is a NR reference signal configured in symbol 5 of the slot. In this case, the first transmission occasion occupies symbols 0-4. Then, a value of K=1 can be configured so that the second transmission occasion avoids the NR reference signal in symbol 5. With K=1, the second transmission occasion starts at symbol 6 and ends at symbol 10. Now, in a second example, assume where the first transmission occasion has starting symbol S=0 and length L=5, and there are two NR reference signals configured in symbols 5 and 6 of the slot. In this case, a value of K=2 is needed so the second transmission occasion avoids the NR reference signals in symbols 5-6. With K=2, the second transmission occasion starts at symbol 7 and ends at symbol 11. So, the methods of the first and second example embodiments allow the flexibility that is not given by the solution of always using a fixed value of K which is predefined.

The methods in the first and second example embodiments also provide the flexibility of configuring the value of K in case there is downlink (DL)/uplink (UL) switching within a slot (i.e., there are a number of uplink symbols in between downlink symbols within a slot). In this case, the flexible solution of the methods of the first and second example embodiments allow different offset values to be configured to avoid different number of uplink symbols in the middle of a slot colliding with the second transmission occasion.

The methods in the first and second example embodiments also provide the flexibility of configuring the value of K in case there are control resource sets (CORESETs) in the middle of a slot (i.e., there is a CORESET configured in between the first and second transmission occasions). In this case, the flexible solution of the methods of the first and second example embodiments allow different offset values to be configured to avoid different number of symbols occupied by the CORESET in the middle of a slot colliding with the second transmission occasion.

The method of the third example embodiment above is beneficial as it allows the offset to be applied to multi-TRP transmission (i.e., when TCI field indicates two TCI states in a codepoint) and not for single-TRP transmission (i.e., when TCI field indicates one TCI state in a codepoint). Note that the scheme under consideration in NR Release 16 is for multi-TRP Ultra-Reliable Low-Latency Communication (URLLC) and configuring such a gap for single TRP may not be beneficial or needed. So, the method of the third example embodiment above allows the configured offset K to be applied only for multi-TRP URLLC.

The methods of the first example embodiment (including step c) and the fourth example embodiment provide a reduction in the downlink control overhead as only the start and length of the first transmission occasion are signaled via the TDRA field in DCI. The other solution is to indicate the start and length of both the first and second transmission occasions via the TDRA field in DCI, but this other solution will increase the number of bits in the TDRA field. Hence, the proposed methods of the first example embodiment (including step c) and the fourth example embodiment are beneficial.

The methods of the first example embodiment (including step d) and the fifth example embodiment above allow multiple offset K values to be configured and one of the values to be indicated via DCI. This is beneficial compared to always using the same offset K value for all the slots. For instance, a first slot may contain an NR reference signal in the middle of the slot, and a value of K=1 may be needed to avoid collision between the NR reference signal in the first slot and the second transmission occasion. In contrast, a second slot may not contain an NR reference signal in the middle of the slot, and there may not be a need for a gap between the first and second transmission occasions in this second slot. So, a value of K=0 is suitable for the second transmission occasion. Via the methods of the first example embodiment (including step d) and the fifth example embodiment above, additional flexibility for choosing different K values for different slots is attained.

Figure 7:
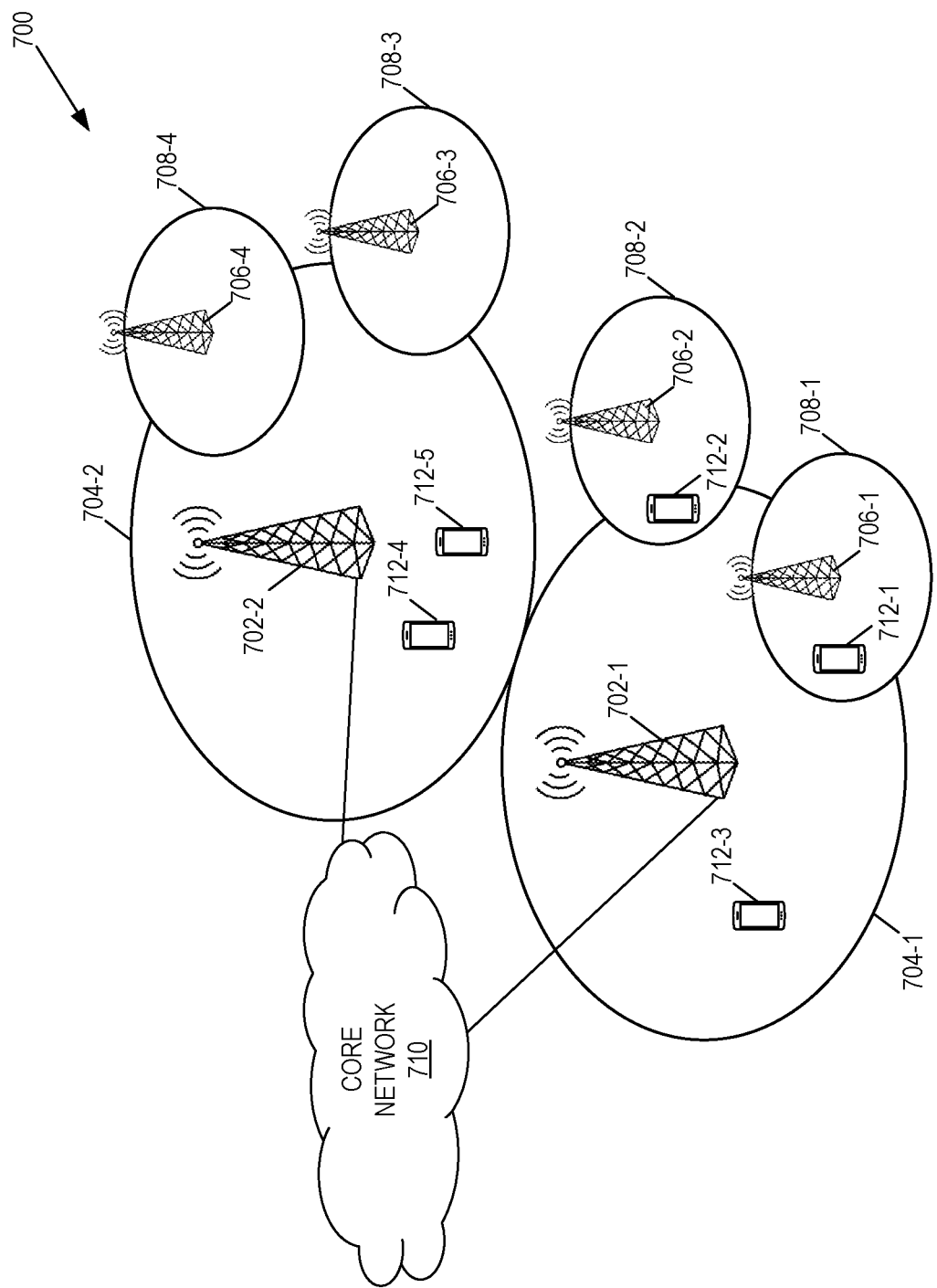
FIG. 7 illustrates one example of a cellular communications system in which embodiments of the present disclosure may be implemented.

FIG. 7 illustrates one example of a cellular communications system 700 in which embodiments of the present disclosure may be implemented. In the embodiments described herein, the cellular communications system 700 is a 5G system (5GS) including a NR RAN (also referred to as a Next Generation RAN (NG-RAN)) or LTE RAN (i.e., E-UTRA RAN) or an Evolved Packet System (EPS) including a LTE RAN. In this example, the RAN includes base stations 702-1 and 702-2, which in LTE are referred to as eNBs (when connected to EPC) and in 5G NR are referred to as gNBs or ng-eNBs (when LTE RAN nodes connected to 5GC), controlling corresponding (macro) cells 704-1 and 704-2. The base stations 702-1 and 702-2 are generally referred to herein collectively as base stations 702 and individually as base station 702. Likewise, the (macro) cells 704-1 and 704-2 are generally referred to herein collectively as (macro) cells 704 and individually as (macro) cell 704. The RAN may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The cellular communications system 700 also includes a core network 710, which in the 5GS is referred to as the 5G core (5GC). The base stations 702 (and optionally the low power nodes 706) are connected to the core network 710.

The base stations 702 and the low power nodes 706 provide service to wireless communication devices 712-1 through 712-5 in the corresponding cells 704 and 708. The wireless communication devices 712-1 through 712-5 are generally referred to herein collectively as wireless communication devices 712 and individually as wireless communication device 712. In the following description, the wireless communication devices 712 are oftentimes UEs, but the present disclosure is not limited thereto.

Figure 8:
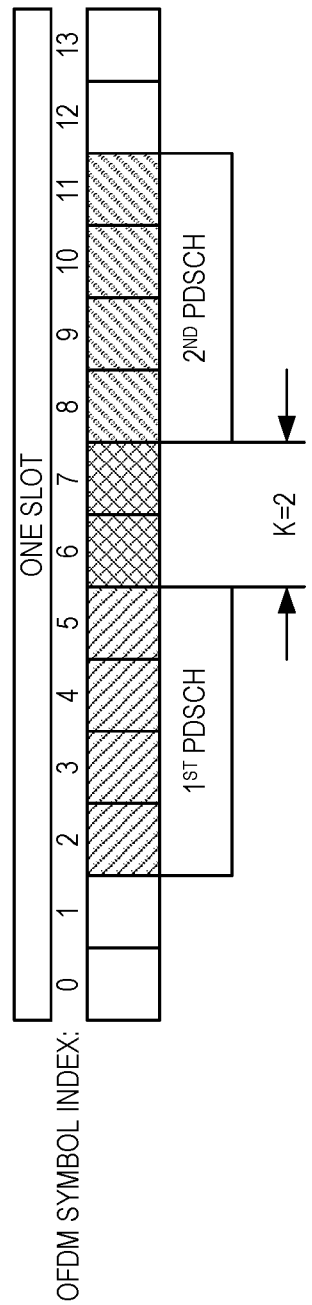
FIG. 8 illustrates an example of an embodiment of the present disclosure where there are two PDSCH transmission occasions within a slot and a starting symbol of the second and, if configured, subsequent PDSCH transmission occasion(s) are signaled through a higher layer configured parameter K.

In some embodiments of this disclosure, it is assumed that multiple PDSCH transmission occasions within a slot are scheduled by a single DCI (i.e., single PDCCH). Only the starting symbol S and the length L in symbols for the first PDSCH transmission occasion is signaled in the DCI. For instance, the starting symbol S and the length L of the first PDSCH transmission occasion are provided by the TDRA field in the DCI. The starting symbol of the second and, if configured, the subsequent PDSCH transmission occasion(s) are signaled through a higher layer configured parameter K, which is the time distance in OFDM symbols between the starting symbol of the second transmission occasion and the last symbol of the first transmission occasion. An example is shown in FIG. 8, where there are two PDSCH transmission occasions within a slot with L=4 and S=2 for the first PDSCH occasion. L and S are signaled to the UE (for example, via the TDRA field in the DCI). The second PDSCH transmission occasion starts at symbol 8 and ends at symbol 11. There is a gap of K=2 symbols between the first and the second transmission occasions. Only K=2 is signaled to the UE for the second transmission occasion, and the UE derives the start and length for the second PDSCH occasion based on S and L of the first PDSCH occasion and K.

In some cases, if a K value is not configured to the UE, then the UE assumes a K value of 0. That means the second transmission occasion starts on the next symbol after which the first transmission occasion ends.

In some embodiments, the candidate values of K may depend on the downlink numerology. It may also additionally depend on the uplink numerology. This is because different gaps may be needed to protect uplink symbols in a case where a slot contains both uplink and downlink symbols. Furthermore, in case of frequency range 2 (FR2), the time required to switch from one TCI state (i.e., receiving using one beam from one TRP) to another TCI state (i.e., receiving using another beam from another TRP) may depend on the downlink numerology. Hence, different candidate values for K depending on downlink and/or UL numerology can be configured to the UE.

Some embodiments of the present disclosure are described below under separate headings. Note that these embodiments may be used separately or in any desired combination.

Embodiment 1: Predefining Candidate K Values with One of the Values Configured by RRC In this embodiment, a set of candidate K values is predefined and one of the values is configured for a UE, e.g., via higher layer signaling (e.g., RRC signaling). For example, the set of candidate K values may include {0,1,2,3,4}, and a UE may be configured with K=2, e.g., by RRC configuration. The RRC configuration may be based on the UE capability. For example, if a UE takes two symbols to switch from receiving from one TRP to another TRP, then the minimum K value that can be configured to the UE is K=2.

Embodiment 2: RRC Configures a List of K Values and One is Dynamically Selected by DCI In some scenarios, a single higher layer (e.g., RRC) configured K value is not flexible enough. In another embodiment, a list of K values is configured for a UE (e.g., via higher layer signaling such as, e.g., RRC signaling), and one value from the list is dynamically indicated in DCI. Either an existing bit field or a new bit field in the DCI may be used for this purpose. This would allow the gNB to flexibly schedule the second PDSCH transmission within a slot. If a single K value is configured by RRC, then that K value is used by default.

Embodiment 3: Configuring a K Value in Each TDRA

For different starting symbols for the first PDSCH transmission occasion and mini-slot lengths, the allowed maximum K value would be different. For example, for S=0 and L=7, only K=0 is possible. While for S=2 and L=4, K can be from 0 to 5. Thus, in another embodiment, a K value is configured in each TDRA together with k0, PDSCH type, and SLIV. This would allow the K value to be configured according to the S and L values configured in each TDRA in the TDRA list and the same TDRA field in the DCI can be used indicate the K value. An example is shown below where each TDRA represented by the higher layer parameter PDSCH-TimeDomainResourceAllocation contains a K value. The maximum value possible for K is given by the parameter maxKvalue which may be, e.g., predefined in 3GPP specifications.

| PDSCH-TimeDomainResourceAllocationList |
|---|
| -- ASN1START<br>-- TAG-PDSCH-TIMEDOMAINRESOURCEALLOCATIONLIST-START<br>PDSCH-TimeDomainResourceAllocationList ::=   SEQUENCE (SIZE(1..maxNrofDL-Allocations)) OF PDSCH-TimeDomainResourceAllocation<br>PDSCH-TimeDomainResourceAllocation ::=  SEQUENCE {<br>   k0                                               INTEGER(0..32) OPTIONAL,   -- Need S<br>   mappingType                              ENUMERATED {typeA, typeB},<br>   startSymbolAndLength                INTEGER (0..127)<br>  K    INTEGER {0..maxKvalue } OPTIONAL<br>}<br>-- TAG-PDSCH-TIMEDOMAINRESOURCEALLOCATIONLIST-STOP<br>-- ASN1STOP |

In another embodiment, the K value in TDRA is only used when multiple PDSCH transmission occasions within a slot with multiple TRPs is signaled. Multi-TRP transmission can be determined, for example, if more than one TCI state is indicated in the DCI. If K is not configured in a TDRA, K=0 is assumed in case of multiple PDSCH transmission occasions.

Embodiment 4: UE Capability Signaling on K Values

In this embodiment, a UE may be required to signal to the gNB its capability on the minimum K value of which it is capable. The capability may only be signaled if the UE is capable of receiving multi-TRP transmissions and multi-TRP transmission is enabled for the UE. In another embodiment, the capability signaling for K may be just to indicate whether K=0 can be supported by the UE.

Embodiment 5: Error Case Scenario

In case a UE receives a DCI scheduling multiple PDSCH transmissions in a slot over multiple TRPs (i.e., multiple transmission occasions) with a K value that, when it is applied, the second PDSCH transmission occasion would go outside the slot, the second PDSCH occasion is ignored by the UE. For example, if the start and length of the first transmission occasion are S=0 and L=7, then a K value of 2 is considered as an error case where the UE would ignore the second PDSCH transmission occasion. This is because a K value of 2 would mean that the $2^{nd}$ transmission occasion would start at symbol 8 within the slot and would have ended in symbol 15. Given a slot only contains 14 symbols, the UE ignores the $2^{nd}$ PDSCH in this case

Additional Aspects/Description

Figure 9:
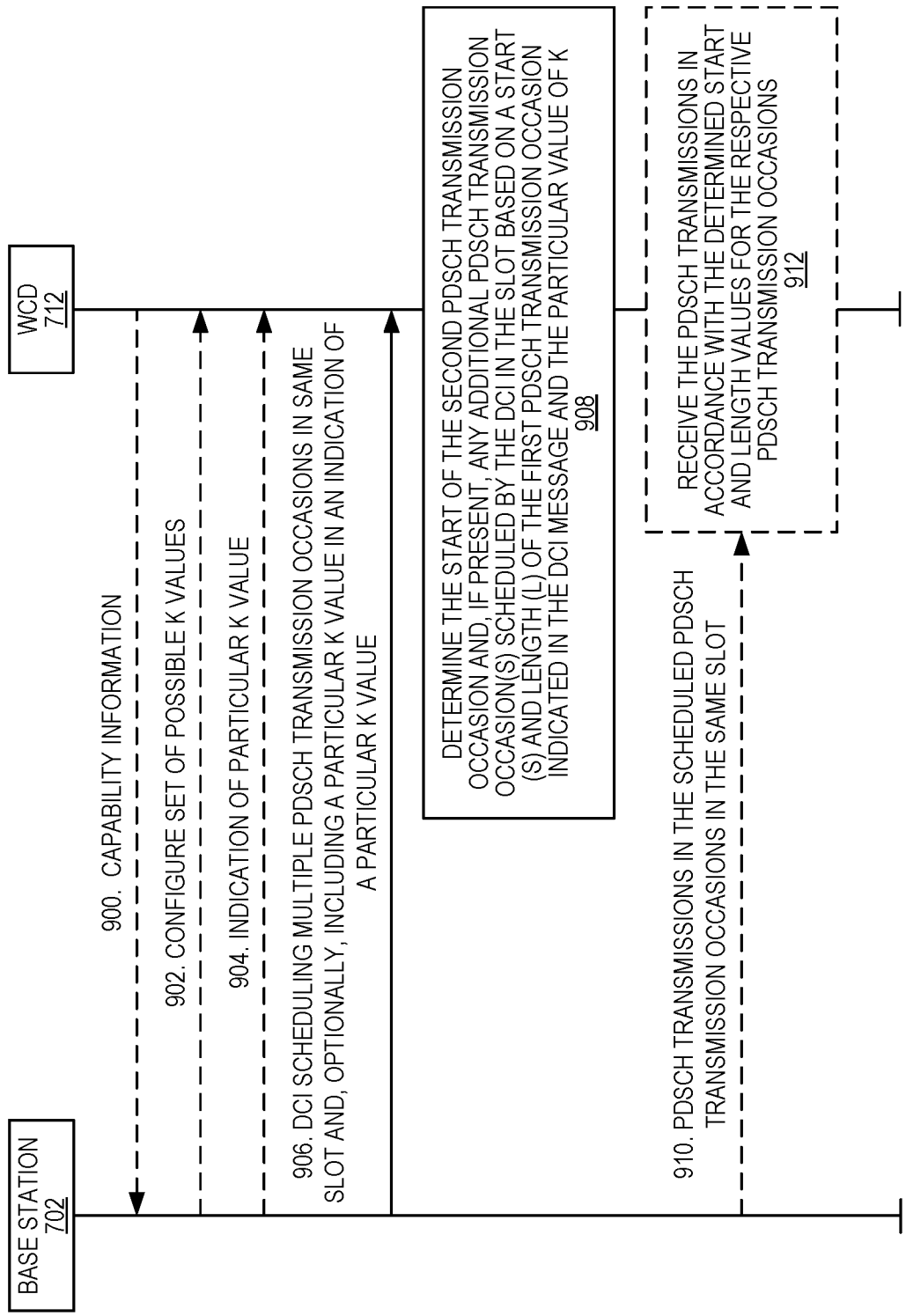
FIG. 9 illustrates the operation of a wireless communication device (WCD) and a base station in accordance with at least some aspects of the embodiments described herein.

FIG. 9 illustrates the operation of a wireless communication device (WCD) 712 (e.g., a UE) and a base station 702 (e.g., a gNB) in accordance with at least some aspects of the embodiments described above. Optional steps are represented by dashed lines or dashed boxes. Note that this process is only an example. It should also be noted that while the base station 702 (e.g., gNB) is illustrated as a single box or element, depending on the particular implementation, the base station 702 (e.g., gNB) may be implemented as a single network node or may be distributed across two or more network nodes. For example, the base station 702 may be implemented as two separate network nodes, namely, a first network node that implements e.g. the PHY and at least a portion of the MAC layer and a second network node that implements higher layers and possibly at portion of the MAC layer. As a specific example, in the case of a gNB, the functionality of the gNB may be separated between a gNB Centralized Unit (gNB-CU) and one or more gNB Distributed Units (gNB-DUs). In this regard, steps or functions described herein as being performed by the base station 702 or gNB may be performed in a distributed manner. For example, a network node that implements the higher layer functionality may "initiate" transmission of a particular message (e.g., by sending the message to another network node that implements the lower layer(s)), thereby causing the other network node that implements the lower layer functionality to actually transmit the particular message.

As illustrated, the WCD 712 optionally sends (e.g., signals), to the base station 702, information that indicates one or more capabilities of the WCD 712 related to K values supported by the WCD 712 (step 900). This capability information may, for example, explicitly or implicitly indicate one or more K values that are supported by the WCD 712, a minimum K value required by the WCD 712, or whether K=0 is supported by the WCD 712 (see, e.g., Embodiment 4).

The base station 702 optionally configures a set of possible K values (also referred to herein as "candidate" K values) for the WCD 712 (step 902). The configuration of the set of possible K values may be via higher layer signaling such as, e.g., RRC signaling. Optionally, the base station 702 configures the WCD 712 with a particular K value (step 904). As discussed above, in one embodiment (e.g., Embodiment 1), the configuration of the particular K value is a semi-static configuration sent via higher layer signaling (e.g., RRC signaling). Note that step 904 is optional in that the particular K value may alternatively be signaled to the WCD 712, e.g., within a DCI message that schedules multiple PDSCH transmission occasions within the same slot (e.g., as in Embodiments 2 and 3).

The base station 702 transmits, and the WCD 712 receives, a DCI (sometimes referred to herein as a "DCI message") where the DCI schedules two or more PDSCH transmission occasions within the same slot (step 906). As discussed above, the DCI message includes a TDRA that includes information that indicates a start S and a length L of the first PDSCH transmission occasion scheduled by the DCI message for the slot. The start of the second PDSCH transmission occasion in the slot and, if present, the start of any additional PDSCH transmission occasion(s) in the slot are determined based on the start (S) and length (L) of the first PDSCH transmission occasion indicated in the DCI message and the particular value of K signaled to the WCD 712 either in step 904 or in the DCI message, depending on the particular embodiment. For example, in one embodiment (e.g., Embodiment 2), the base station 702 dynamically configures the particular K value by signaling an indication of one of the set of possible K values (from step 902) to be used as the particular K value in the DCI message. As discussed above, in another embodiment (e.g., Embodiment 3), the base station 702 dynamically configures the particular K value by signaling the particular K value in the DCI message (e.g., in the TDRA contained in the DCI message).

The WCD 712 determines the start of the second PDSCH transmission occasion and the start of any additional subsequent PDSCH transmission occasion(s) in the slot based on the start (S) and length (L) of the first PDSCH transmission indicated in the DCI message and the particular value of K, as described above (step 908). The base station 702 transmits (step 910), and the WCD 712 receives (912), PDSCH transmissions in the two or more PDSCH transmission occasions in accordance with determined start and length values for the respective PDSCH transmission occasions, as described above.

Figure 10:
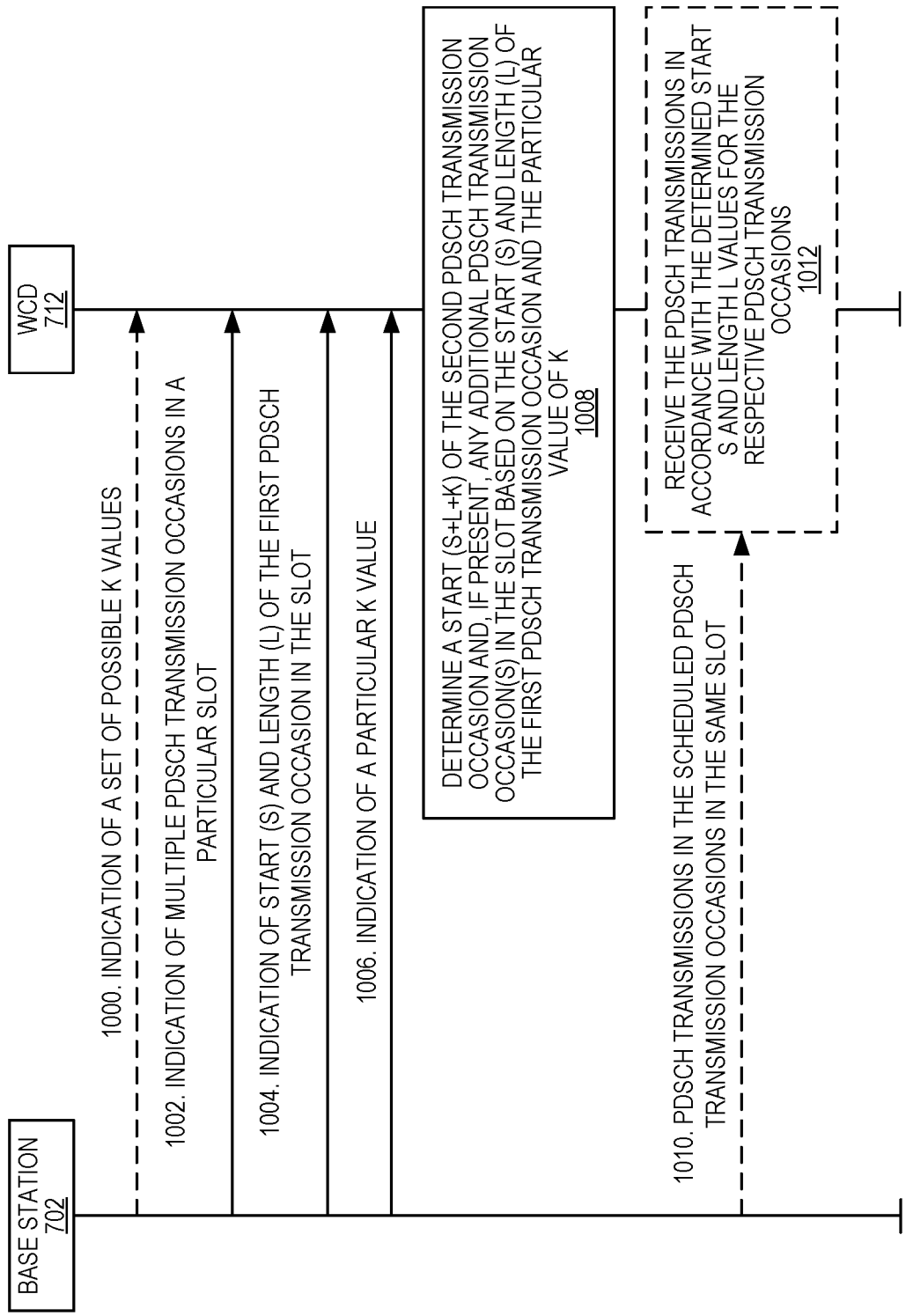
FIG. 10 illustrates the operation of a WCD and a base station in accordance with at least some aspects of the embodiments described herein.

FIG. 10 illustrates the operation of a wireless communication device (WCD) 712 (e.g., a UE) and a base station 702 (e.g., a gNB) in accordance with at least some aspects of the embodiments described above. Optional steps are represented by dashed lines or dashed boxes. Note that this process is only an example. It should also be noted that while the base station 702 (e.g., gNB) is illustrated as a single box or element, depending on the particular implementation, the base station 702 (e.g., gNB) may be implemented as a single network node or may be distributed across two or more network nodes. For example, the base station 702 may be implemented as two separate network nodes, namely, a first network node that implements e.g. the PHY and at least a portion of the MAC layer and a second network node that implements higher layers and possibly at portion of the MAC layer. As a specific example, in the case of a gNB, the functionality of the gNB may be separated between a gNB Centralized Unit (gNB-CU) and one or more gNB Distributed Units (gNB-DUs). In this regard, steps or functions described herein as being performed by the base station 702 or gNB may be performed in a distributed manner. For example, a network node that implements the higher layer functionality may "initiate" transmission of a particular message (e.g., by sending the message to another network node that implements the lower layer(s)), thereby causing the other network node that implements the lower layer functionality to actually transmit the particular message.

The process of FIG. 10 is similar to that of FIG. 9.

As illustrated, the base station 702 optionally sends, to the WCD 712, an indication of a set of possible K values (also referred to herein as "candidate" K values) for the WCD 712 (step 1000). The configuration of the set of possible K values may be via higher layer signaling such as, e.g., RRC signaling. The base station 702 sends, to the WCD 712, an indication of multiple PDSCH transmission occasions in a particular slot (step 1002). For example, this indication may be the DCI message of step 906 of FIG. 9, but is not limited thereto. In particular, in one example, this indication is via the TCI field in DCI which indicates two transmission occasions when there are more than 1 TCI state indicated by a codepoint in the TCI field. The base station 702 also sends, to the WCD 712, an indication of a start S and a length L of the first PDSCH transmission occasion in the particular slot (step 1004). For example, this indication may also be the DCI message (specifically the TDRA included in the DCI message) of step 906 of FIG. 9. The base station 702 also sends, to the WCD 712, an indication of a particular K value (step 1006). For example, as discussed above, in one embodiment (e.g., Embodiment 1), the configuration of the particular K value is a semi-static configuration sent via higher layer signaling (e.g., RRC signaling). As another example, in one embodiment (e.g., Embodiment 2), the base station 702 dynamically configures the particular K value by signaling an indication of one of the set of possible K values (from step 1000) to be used as the particular K value in the DCI message. As discussed above, in another embodiment (e.g., Embodiment 3), the base station 702 dynamically configures the particular K value by signaling the particular K value in the DCI message (e.g., in the TDRA contained in the DCI message).

The WCD 712 determines the start of the second PDSCH transmission occasion and the start of any additional subsequent PDSCH transmission occasion(s) in the slot based on the start (S) and length (L) of the first PDSCH transmission indicated in the DCI message and the particular value of K, as described above (step 1008). The base station 702 transmits (step 1010), and the WCD 712 receives (1012), PDSCH transmissions in the two or more PDSCH transmission occasions in accordance with determined start and length values for the respective PDSCH transmission occasions, as described above.

Figure 11:
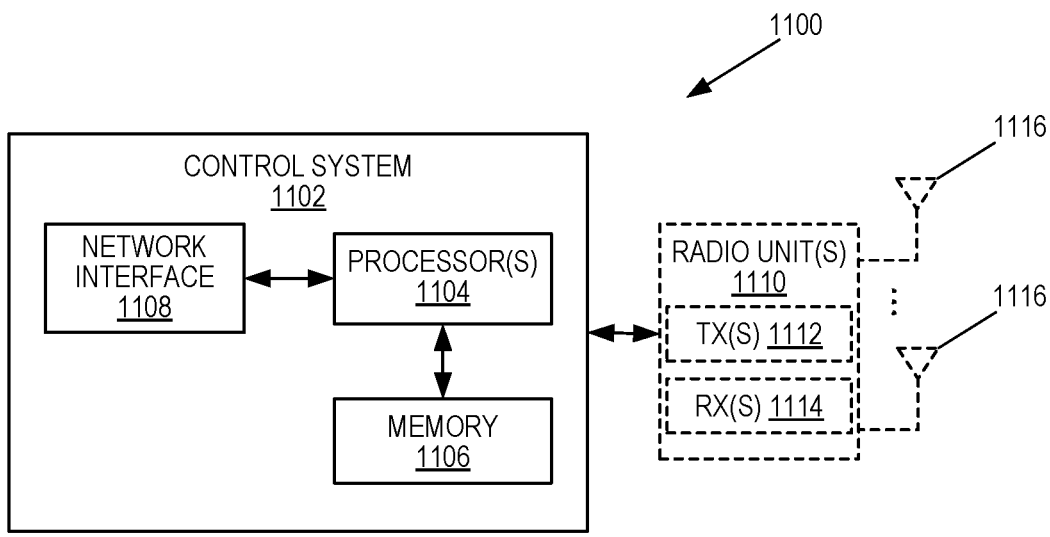
FIGS. 11 through 13 are schematic block diagrams of example embodiments of a radio access node.

FIG. 11 is a schematic block diagram of a radio access node 1100 according to some embodiments of the present disclosure. Optional features are represented by dashed boxes. The radio access node 1100 may be, for example, a base station 702 or 706 or a network node that implements all or part of the functionality of the base station 702 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein (e.g., one or more functions of a network node, base station, or gNB as described herein). In some embodiments, the function(s) are implemented in software that is stored, e.g., in the memory 1106 and executed by the one or more processors 1104.

Figure 12:
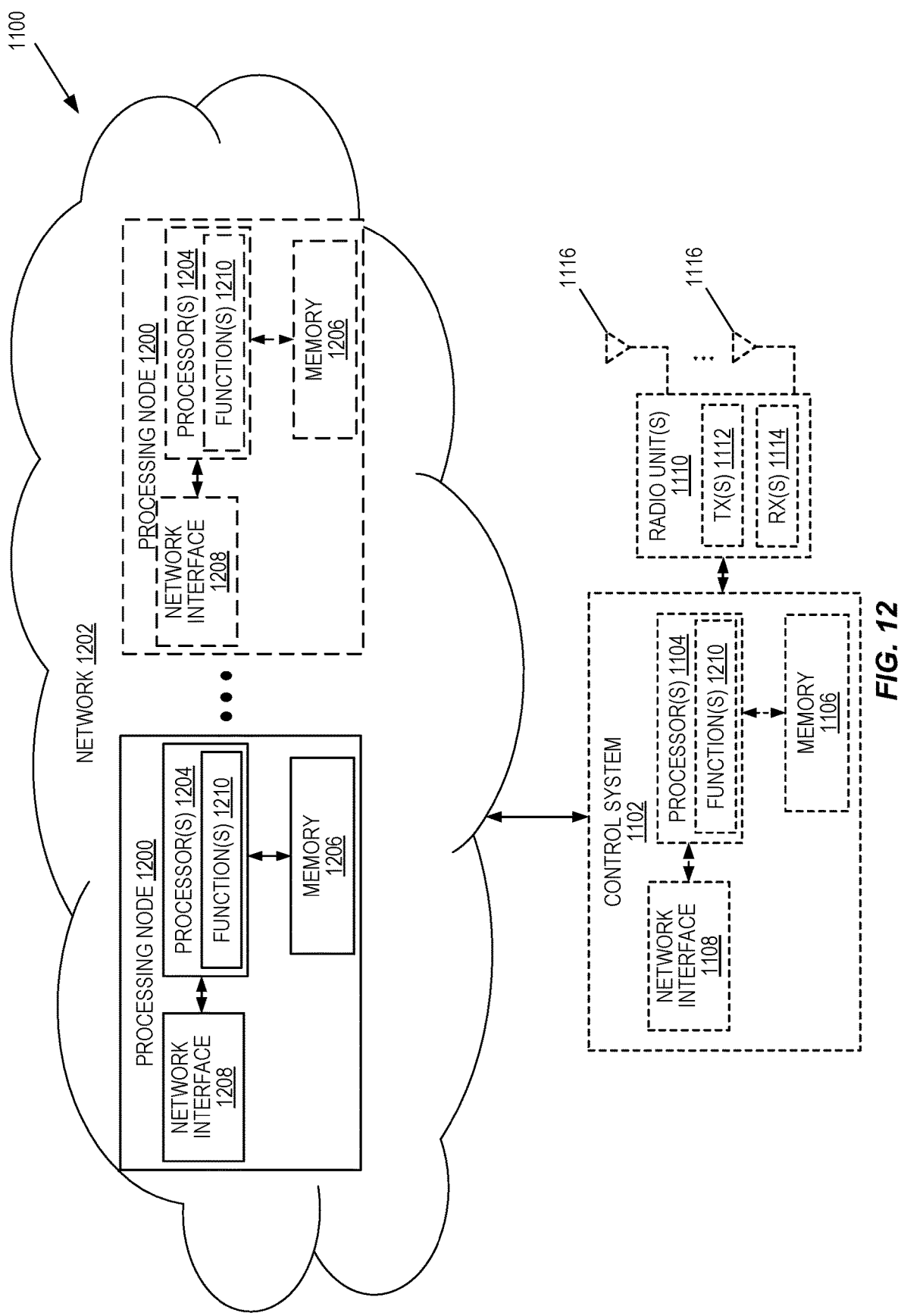

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions of a network node, base station, or gNB as described herein) are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein (e.g., one or more functions of a network node, base station, or gNB as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
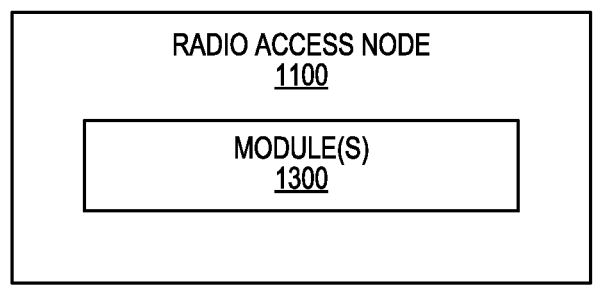

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions of a network node, base station, or gNB as described herein). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
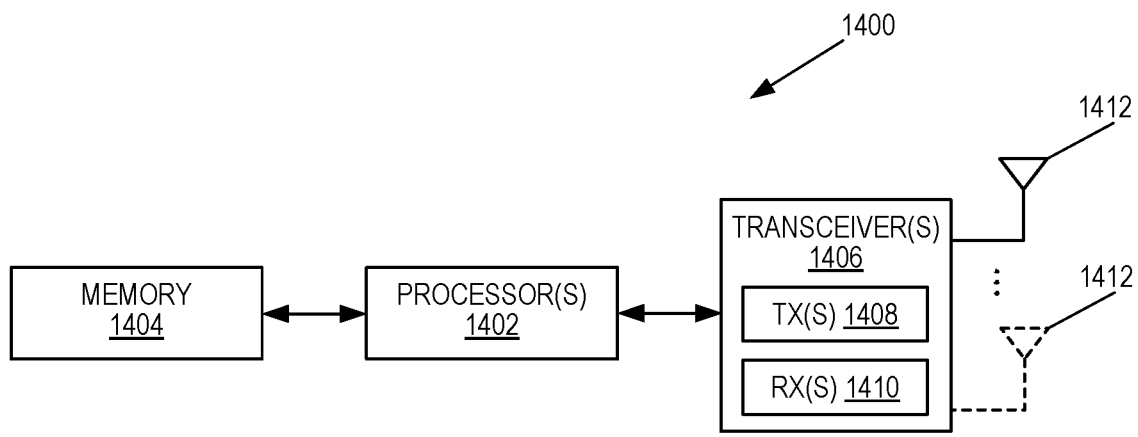
FIGS. 14 and 15 are schematic block diagrams of example embodiments of a wireless communication device.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above (e.g., one or more functions of a wireless communication device 712 or UE as described herein) may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein (e.g., one or more functions of a wireless communication device 712 or UE as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
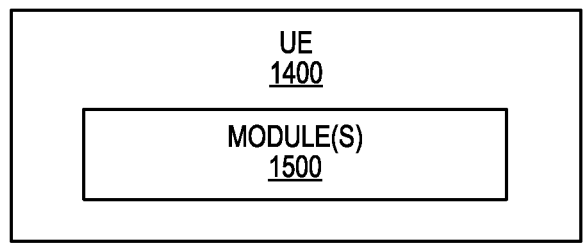

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein (e.g., one or more functions of a wireless communication device 712 or UE as described herein).

Figure 16:
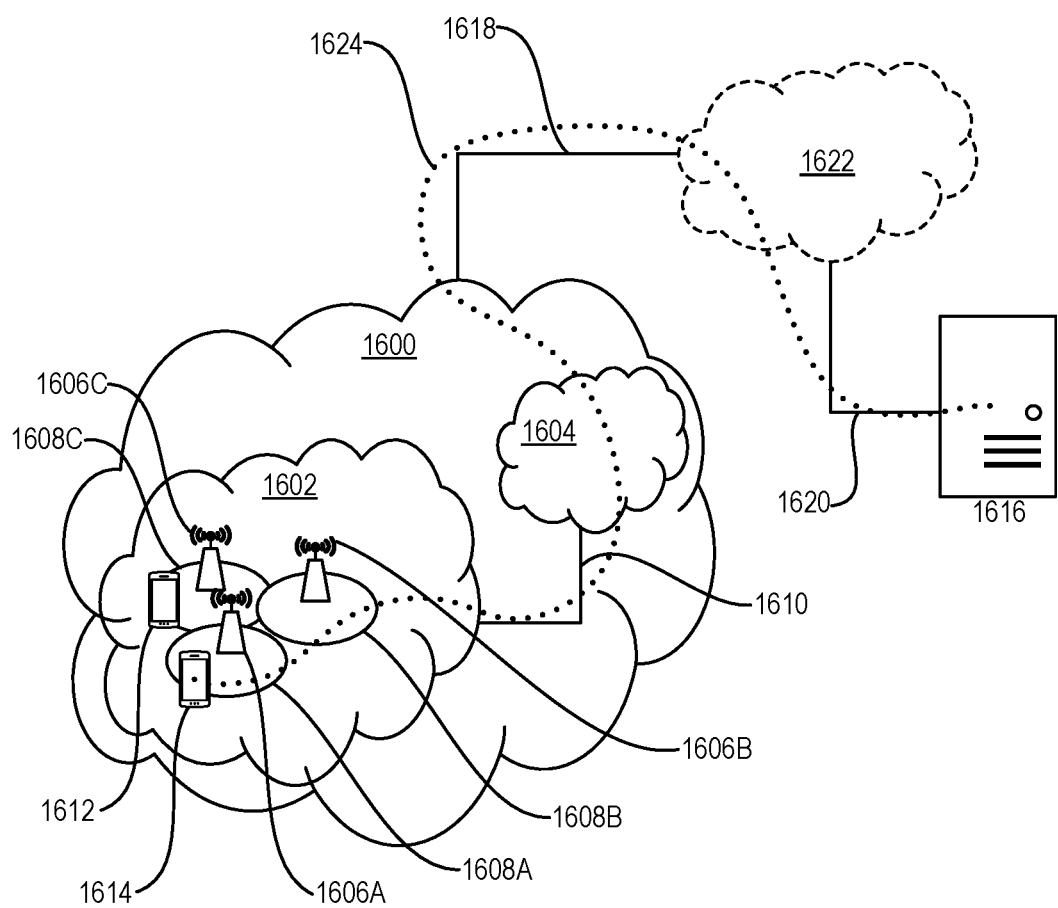
FIG. 16 illustrates an example embodiment of a communication system in which embodiments of the present disclosure may be implemented.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
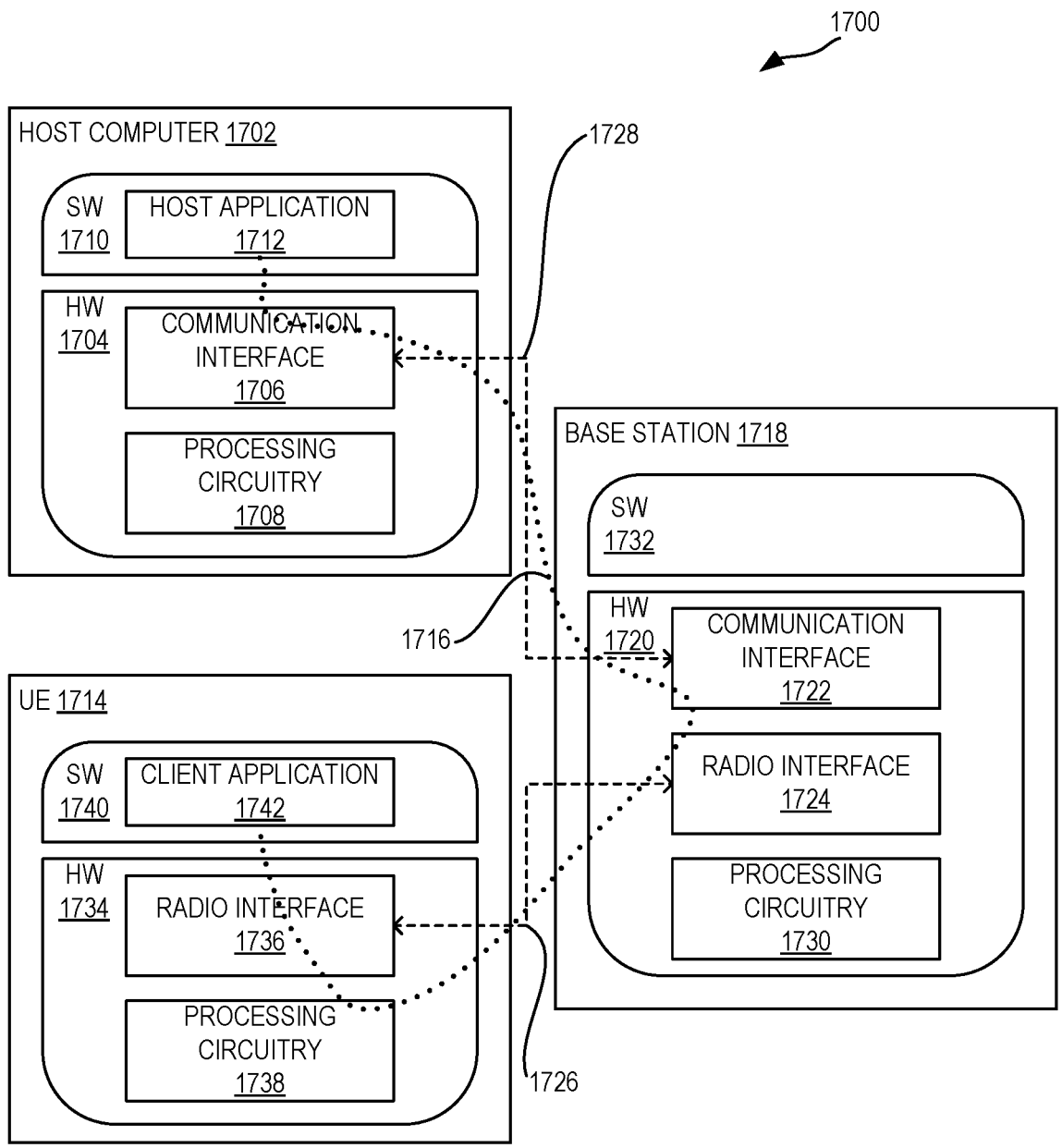
FIG. 17 illustrates example embodiments of the host computer, base station, and UE of FIG. 16.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (e.g., a UE) for determining a starting symbol of a plurality of transmission occasions, the method comprising one or more of: receiving (1002) an indication that there are multiple transmission occasions; receiving (1004) an indication of a starting symbol S and a length L of a first transmission occasion; receiving (1006) an indication of a particular K value that is to be applied for determining a starting symbol of a second transmission occasion; determining (1008) the starting symbol of the second transmission occasion (e.g., as S+L+K).

Embodiment 2: The method of embodiment 1 wherein the multiple transmission occasions are multiple PDSCH transmission occasions.

Embodiment 3: The method of embodiment 1 or 2 wherein the multiple transmission occasions are in the same slot.

Embodiment 4: The method of any of embodiments 1 to 3 wherein the first transmission occasion is the first transmission occasion from among the multiple transmission occasions.

Embodiment 5: The method of embodiment 4 wherein the second transmission occasion is the second transmission occasion from among the multiple transmission occasions.

Embodiment 6: The method of any of embodiments 1 to 5 further comprising: receiving (1000) an indication of a set of possible K values; wherein receiving (1006) the indication of the particular K value comprises receiving (1006) an indication of one of the set of possible K values as the particular K value.

Embodiment 7: The method of embodiment 6 wherein receiving (1000) the indication of the set of possible K values comprises receiving (1000) the indication of the set of possible K values via higher layer signaling.

Embodiment 8: The method of any of embodiments 1 to 6 wherein receiving (1002) the indication that there are multiple transmission occasions comprises receiving (1002) the indication that there are multiple transmission occasions via a TCI field in a DCI which indicates two transmission occasions when there are more than 1 TCI state indicated by a codepoint in the TCI field.

Embodiment 9: The method of any of embodiments 1 to 8 wherein receiving (1004) the indication of the start S and the length L of the first transmission occasion comprises receiving (1004) the indication of the start S and the length L of the first transmission occasion via a TDRA field in DCI.

Embodiment 10: The method of any of embodiments 1 to 9 wherein receiving (1006) the indication of the particular K value comprises receiving (1006) the indication of the particular K value via a field in DCI.

Embodiment 11: The method of any of embodiments 1 to 10 comprising receiving (906) a DCI message that schedules the multiple transmission occasions in a same slot, wherein the DCI message comprises the indication that there are multiple transmission occasions and that indication of the starting symbol S and the length L of the first transmission occasion.

Embodiment 12: The method of embodiment 11 wherein the DCI message further comprises the indication of the particular K value.

Embodiment 13: The method of any of the previous embodiments, further comprising: providing user data; and forwarding the user data to a host computer via the transmission to the base station.

Group B Embodiments

Embodiment 14: A method performed by a base station for signaling a starting symbol of a plurality of transmission occasions, the method comprising one or more of: sending (1002), to a wireless communication device, an indication that there are multiple transmission occasions; sending (1004), to the wireless communication device, an indication of a starting symbol S and a length L of a first transmission occasion; and sending (1006), to the wireless communication device, an indication of a particular K value that is to be applied for determining a starting symbol of a second transmission occasion.

Embodiment 15: The method of embodiment 14 wherein the starting symbol of the second transmission occasion is S+L+K.

Embodiment 16: The method of embodiment 14 or 15 wherein the multiple transmission occasions are multiple PDSCH transmission occasions.

Embodiment 17: The method of any of embodiments 14 to 16 wherein the multiple transmission occasions are in the same slot.

Embodiment 18: The method of any of embodiments 14 to 17 wherein the first transmission occasion is the first transmission occasion from among the multiple transmission occasions.

Embodiment 19: The method of embodiment 18 wherein the second transmission occasion is the second transmission occasion from among the multiple transmission occasions.

Embodiment 20: The method of any of embodiments 14 to 19 further comprising: sending (1000), to the wireless communication device, an indication of a set of possible K values; wherein sending (1006) the indication of the particular K value comprises sending (1006) an indication of one of the set of possible K values as the particular K value.

Embodiment 21: The method of embodiment 20 wherein sending (1000) the indication of the set of possible K values comprises sending (1000) the indication of the set of possible K values via higher layer signaling.

Embodiment 22: The method of any of embodiments 14 to 21 wherein sending (1002) the indication that there are multiple transmission occasions comprises sending (1002) the indication that there are multiple transmission occasions via a TCI field in a DCI which indicates two transmission occasions when there are more than 1 TCI state indicated by a codepoint in the TCI field.

Embodiment 23: The method of any of embodiments 14 to 22 wherein sending (1004) the indication of the start S and the length L of the first transmission occasion comprises sending (1004) the indication of the start S and the length L of the first transmission occasion via a TDRA field in DCI.

Embodiment 24: The method of any of embodiments 14 to 23 wherein sending (1006) the indication of the particular K value comprises sending (1006) the indication of the particular K value via a field in DCI.

Embodiment 25: The method of any of embodiments 14 to 24 comprising sending (906), to the wireless communication device, a DCI message that schedules the multiple transmission occasions in a same slot, wherein the DCI message comprises the indication that there are multiple transmission occasions and that indication of the starting symbol S and the length L of the first transmission occasion.

Embodiment 26: The method of embodiment 25 wherein the DCI message further comprises the indication of the particular K value.

Embodiment 27: The method of any of the previous embodiments, further comprising: obtaining user data; and forwarding the user data to a host computer or a wireless device.

Group C Embodiments

Embodiment 28: A wireless device comprising: processing circuitry configured to perform any of the steps of any of the Group A embodiments; and power supply circuitry configured to supply power to the wireless device.

Embodiment 29: A base station comprising: processing circuitry configured to perform any of the steps of any of the Group B embodiments; and power supply circuitry configured to supply power to the base station.

Embodiment 30: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 31: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 32: The communication system of the previous embodiment further including the base station.

Embodiment 33: The communication system of the previous 2 embodiments, further including the UE, wherein the UE is configured to communicate with the base station.

Embodiment 34: The communication system of the previous 3 embodiments, wherein: the processing circuitry of the host computer is configured to execute a host application, thereby providing the user data; and the UE comprises processing circuitry configured to execute a client application associated with the host application.

Embodiment 35: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 36: The method of the previous embodiment, further comprising, at the base station, transmitting the user data.

Embodiment 37: The method of the previous 2 embodiments, wherein the user data is provided at the host computer by executing a host application, the method further comprising, at the UE, executing a client application associated with the host application.

Embodiment 38: A User Equipment, UE, configured to communicate with a base station, the UE comprising a radio interface and processing circuitry configured to perform the method of the previous 3 embodiments.

Embodiment 39: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 40: The communication system of the previous embodiment, wherein the cellular network further includes a base station configured to communicate with the UE.

Embodiment 41: The communication system of the previous 2 embodiments, wherein: the processing circuitry of the host computer is configured to execute a host application, thereby providing the user data; and the UE's processing circuitry is configured to execute a client application associated with the host application.

Embodiment 42: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 43: The method of the previous embodiment, further comprising at the UE, receiving the user data from the base station.

Embodiment 44: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 45: The communication system of the previous embodiment, further including the UE.

Embodiment 46: The communication system of the previous 2 embodiments, further including the base station, wherein the base station comprises a radio interface configured to communicate with the UE and a communication interface configured to forward to the host computer the user data carried by a transmission from the UE to the base station.

Embodiment 47: The communication system of the previous 3 embodiments, wherein: the processing circuitry of the host computer is configured to execute a host application; and the UE's processing circuitry is configured to execute a client application associated with the host application, thereby providing the user data.

Embodiment 48: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 49: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 50: The method of the previous embodiment, further comprising, at the UE, providing the user data to the base station.

Embodiment 51: The method of the previous 2 embodiments, further comprising: at the UE, executing a client application, thereby providing the user data to be transmitted; and at the host computer, executing a host application associated with the client application.

Embodiment 52: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 53: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 54: The communication system of the previous embodiment further including the base station.

Embodiment 55: The communication system of the previous 2 embodiments, further including the UE, wherein the UE is configured to communicate with the base station.

Embodiment 56: The communication system of the previous 3 embodiments, wherein: the processing circuitry of the host computer is configured to execute a host application; and the UE is configured to execute a client application associated with the host application, thereby providing the user data to be received by the host computer.

Embodiment 57: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 58: The method of the previous embodiment, further comprising at the base station, receiving the user data from the UE.

Embodiment 59: The method of the previous 2 embodiments, further comprising at the base station, initiating a transmission of the received user data to the host computer.

Group D Embodiments

Embodiment 60: A method for indicating the starting symbol of a plurality of PDSCH transmission occasions, the method comprising one or more of:
  a. A first indication to the UE from the network of at least one offset value K
  b. A second indication to the UE from the network that there are multiple PDSCH transmission occasions
  c. A third indication to indicate the starting symbol S and length L of the first transmission occasion
  d. A fourth indication (in case more than one K offset is configured by first indication) of which of the K offset values should be applied for determining the starting symbol of the second transmission occasion.
  e. Determining the starting symbol of the $2^{nd}$ transmission occasion as S+L+K.

Embodiment 61: The method of embodiment 60, where the first indication is via higher layers (e.g., RRC).

Embodiment 62: The method of any of embodiments 60-61, where the second indication is via the TCI field in DCI which indicates two transmission occasions when there are more than 1 TCI state indicated by a codepoint in the TCI field.

Embodiment 63: The method of any of embodiments 60-62, where the third indication is via a TDRA field in DCI.

Embodiment 64: The method of any of embodiments 60-63, where the fourth indication is via a field in DCI.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless communication device, the method comprising:
   receiving an indication of a plurality of transmission occasions for a respective plurality of downlink transmissions to the wireless communication device, wherein:
      at least two of the plurality of downlink transmissions are associated to different transmission configuration indication (TCI) states;
      the plurality of transmission occasions is a plurality of Physical Downlink Shared Channel transmission occasions; and
      the plurality of downlink transmissions is a plurality of repetitions of a same data transmission;
   receiving an indication of a starting symbol and a length of a first transmission occasion of the plurality of transmission occasions in a time domain resource allocation (TDRA) field in a downlink control information (DCI) that schedules the plurality of PDSCH transmission occasions, wherein the starting symbol and the length comprise a single starting symbol and a single length that are contained in a row indexed by the TDRA field in a TDRA table;
   receiving an indication of a particular offset value that is to be applied for determining a starting symbol of a second transmission occasion of the plurality of transmission occasions wherein:
      the indication of the particular offset value is signaled in a separate message from the indication of the starting symbol and the length of the first transmission occasion; and
      the second transmission occasion has a same length as the first transmission occasion; and
   determining the starting symbol of the second transmission occasion based on the starting symbol of the first transmission occasion, the length of the first transmission occasion, and the particular offset value.

2. The method of claim 1 wherein determining the starting symbol of the second transmission occasion comprises determining the starting symbol of the second transmission occasion is S+L+K, where S is the starting symbol of the first transmission occasion, L is the length of the first transmission occasion, and K is the particular offset value.

3. The method of claim 1 wherein receiving the indication of the plurality of transmission occasions comprises receiving the indication of the plurality of transmission occasions via a TCI field in the DCI, the TCI field indicating more than one TCI state and thus more than one transmission occasion.

4. The method of claim 1 wherein:
   the plurality of transmission occasions are in a same slot.

5. The method of claim 1, wherein the indication of the particular offset value is signaled via Radio Resource Control (RRC) signaling.

6. The method of claim 1, further comprising:
   transmitting, by the wireless communication device to a network node prior to receiving the indication of the plurality of transmission occasions and the indication of the starting symbol and the length of the first transmission occasion, a minimum offset value between the end of the first transmission occasion and the start of the second transmission occasion of the plurality of downlink transmissions that the wireless communication device is capable of receiving.

7. The method of claim 1, wherein:
   the TDRA table comprises a plurality of rows or sets of time domain resource allocation parameters; and
   each row or set comprises a starting symbol and a length for a transmission occasion.

8. A wireless communication device comprising:
   one or more transmitters;
   one or more receivers; and
   processing circuitry associated with the one or more transmitters and the one or more receivers, the processing circuitry configured to cause the wireless communication device to:
      receive an indication of a plurality of transmission occasions for a respective plurality of downlink transmissions to the wireless communication device, wherein:
         at least two of the plurality of downlink transmissions are associated to different transmission configuration indication states;
         the plurality of transmission occasions is a plurality of Physical Downlink Shared Channel transmission occasions; and
         the plurality of downlink transmissions is a plurality of repetitions of a same data transmission;
      receive an indication of a starting symbol and a length of a first transmission occasion of the plurality of transmission occasions in a time domain resource allocation (TDRA) field in a downlink control information (DCI) that schedules the plurality of PDSCH transmission occasions, wherein the starting symbol and the length are contained in a single row indexed by the TDRA field in a single TDRA table;
      receive an indication of a particular offset value that is to be applied for determining a starting symbol of a second transmission occasion of the plurality of transmission occasions, wherein:
         the indication of the particular offset value is signaled in a separate message from the indication of the starting symbol and the length of the first transmission occasion; and
         the second transmission occasion has a same length as the first transmission occasion; and
      determine a starting symbol of the second transmission occasion based on the starting symbol of the first transmission occasion, the length of the first transmission occasion, and the particular offset value.

9. The wireless communication device of claim 8 wherein determining the starting symbol of the second transmission occasion comprises determining the starting symbol of the second transmission occasion is S+L+K, where S is the starting symbol of the first transmission occasion, L is the length of the first transmission occasion, and K is the particular offset value.

10. The wireless communication device of claim 8 wherein receiving the indication of the plurality of transmission occasions comprises receiving the indication of the plurality of transmission occasions via a Transmission Configuration Indication (DCI) field in the DCI, the TCI field indicating more than one TCI state and thus more than one transmission occasion.

11. The wireless communication device of claim 8 wherein:
the plurality of transmission occasions are in a same slot.

12. The wireless communication device of claim 8, wherein the indication of the particular offset value is signaled via Radio Resource Control (RRC) signaling.

13. The wireless communication device of claim 8, wherein the processing circuitry is further configured to cause the wireless communication device to transmit, to a network node prior to receiving the indications, a minimum offset value between the end of the first transmission occasion and the start of the second transmission occasion of the plurality of downlink transmissions that the wireless communication device is capable of receiving.

14. The wireless communication device of claim 8, wherein:
the TDRA table comprises a plurality of rows or sets of time domain resource allocation parameters; and
each row or set comprises a starting symbol and a length for a transmission occasion.

15. A method performed by a wireless communication device, the method comprising:
receiving a Downlink Control Information (DCI) that schedules a plurality of transmission occasions for a respective plurality of downlink transmissions to the wireless communication device in a single slot, wherein:
the DCI comprises:
information that indicates that at least two of the plurality of downlink transmissions are associated to different transmission configuration indication states; and
information that indicates a starting symbol and a length of a first transmission occasion of the plurality of transmission occasions;
the plurality of transmission occasions is a plurality of Physical Downlink Shared Channel transmission occasions; and
the plurality of downlink transmissions is a plurality of repetitions of a same data transmission, wherein the plurality of repetitions have a same length; and
determining a starting symbol of a second transmission occasion of the plurality of transmission occasions based on the starting symbol of the first transmission occasion, the length of the first transmission occasion, and a particular offset value, wherein the particular offset value is:
a value indicated to the wireless communication device in a separate message from the DCI if the wireless communication device has received an indication of the particular offset value; and
a predefined value if the wireless communication device has not received an indication of the particular offset value.

16. The method of claim 15 wherein the separate message is signaled via Radio Resource Control (RRC) signaling.

17. The method of claim 15, further comprising transmitting, to a network node prior to receiving the DCI, a minimum offset value between the end of the first transmission occasion and the start of the second transmission occasion of the plurality of downlink transmissions that the wireless communication device is capable of receiving.

18. The method of claim 15, wherein the predefined value is a value of zero (0).

19. A wireless communication device comprising:
one or more transmitters;
one or more receivers; and
processing circuitry associated with the one or more transmitters and the one or more receivers, the processing circuitry configured to cause the wireless communication device to:
receive a Downlink Control Information (DCI) that schedules a plurality of transmission occasions for a respective plurality of downlink transmissions to the wireless communication device in a single slot, wherein:
the DCI comprises:
information that indicates that at least two of the plurality of downlink transmissions are associated to different transmission configuration indication states; and
information that indicates a starting symbol and a length of a first transmission occasion of the plurality of transmission occasions;
the plurality of transmission occasions is a plurality of Physical Downlink Shared Channel (PDSCH) transmission occasions; and
the plurality of downlink transmissions is a plurality of repetitions of a same data transmission, wherein the plurality of repetitions have a same length; and
determine a starting symbol of a second transmission occasion of the plurality of transmission occasions based on the starting symbol of the first transmission occasion, the length of the first transmission occasion, and a particular offset value, wherein the particular offset value is:
a value indicated to the wireless communication device in a separate message from the DCI if the wireless communication device has received an indication of the particular offset value; and
a predefined value if the wireless communication device has not received an indication of the particular offset value.

20. The wireless communication device of claim 19, wherein the separate message is signaled via Radio Resource Control (RRC) signaling.

21. The wireless communication device of claim 19, wherein the processing circuitry is further configured to cause the wireless communication device to transmit, to a network node prior to receiving the DCI, a minimum offset value between the end of the first transmission occasion and the start of the second transmission occasion of the plurality of downlink transmissions that the wireless communication device is capable of receiving.

22. The wireless communication device of claim 19, wherein the predefined value is a value of zero (0).

23. A method performed by a wireless communication device, the method comprising:
- receiving an indication of a plurality of transmission occasions for a respective plurality of downlink transmissions to the wireless communication device, wherein:
  - at least two of the plurality of downlink transmissions are associated to different transmission configuration indication (TCI) states;
  - the plurality of transmission occasions is a plurality of Physical Downlink Shared Channel (PDSCH) transmission occasions; and
  - the plurality of downlink transmissions is a plurality of repetitions of a same data transmission;
- receiving an indication of a starting symbol and a length of a first transmission occasion of the plurality of transmission occasions in a time domain resource allocation (TDRA) field in a downlink control information (DCI) that schedules the plurality of PDSCH transmission occasions, wherein the starting symbol and the length comprise a single starting symbol and a single length that are contained in a row indexed by the TDRA field in a TDRA table;
- determining that an indication of a particular offset value that is to be applied for determining a starting symbol of a second transmission occasion of the plurality of transmission occasions is not signaled; and
- responsive to determining that the indication of the particular offset value is not signaled, determining the starting symbol of the second transmission occasion based on the starting symbol of the first transmission occasion, the length of the first transmission occasion, and an offset value of zero (0).

24. A wireless communication device comprising:
- one or more transmitters;
- one or more receivers; and
- processing circuitry associated with the one or more transmitters and the one or more receivers, the processing circuitry configured to cause the wireless communication device to:
  - receive an indication of a plurality of transmission occasions for a respective plurality of downlink transmissions to the wireless communication device, wherein:
    - at least two of the plurality of downlink transmissions are associated to different transmission configuration indication states;
    - the plurality of transmission occasions is a plurality of Physical Downlink Shared Channel (PDSCH) transmission occasions; and
    - the plurality of downlink transmissions is a plurality of repetitions of a same data transmission;
  - receive an indication of a starting symbol and a length of a first transmission occasion of the plurality of transmission occasions in a time domain resource allocation (TDRA) field in a downlink control information (DCI) that schedules the plurality of PDSCH transmission occasions, wherein the starting symbol and the length are contained in a single row indexed by the TDRA field in a single TDRA table;
  - determine that an indication of a particular offset value that is to be applied for determining a starting symbol of a second transmission occasion of the plurality of transmission occasions is not signaled; and
  - responsive to determining that the indication of the particular offset value is not signaled, determine the starting symbol of the second transmission occasion based on the starting symbol of the first transmission occasion, the length of the first transmission occasion, and an offset value of zero (0).

* * * * *